United States Patent
Young et al.

(10) Patent No.: US 11,178,409 B2
(45) Date of Patent: Nov. 16, 2021

(54) PROBABILITY MAPPING FOR ENTROPY CODING

(71) Applicant: GOOGLE LLC, Mountain View, CA (US)

(72) Inventors: Joseph Young, Mountain View, CA (US); Dake He, Cupertino, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 16/812,539

(22) Filed: Mar. 9, 2020

(65) Prior Publication Data

US 2020/0213599 A1 Jul. 2, 2020

Related U.S. Application Data

(63) Continuation of application No. 16/659,666, filed on Oct. 22, 2019, now Pat. No. 10,893,280, which is a
(Continued)

(51) Int. Cl.
*H04N 19/176* (2014.01)
*H04N 19/13* (2014.01)
(Continued)

(52) U.S. Cl.
CPC .......... *H04N 19/18* (2014.11); *H04N 19/124* (2014.11); *H04N 19/129* (2014.11); *H04N 19/13* (2014.11);
(Continued)

(58) Field of Classification Search
None
See application file for complete search history.

(56) References Cited

U.S. PATENT DOCUMENTS 6,157,676 A 12/2000 Takaoka et al.
6,282,322 B1 8/2001 Rackett
(Continued)

FOREIGN PATENT DOCUMENTS

GB 2205704 A 12/1988
WO 2018212582 A1 11/2018

OTHER PUBLICATIONS

U. Joshi et al.; "Novel inter and intra prediction tools under consideration for the emerging AV1 video codec", 10396 Proc. SPIE F1-F13; Sep. 19, 2017); 14 pages.

*Primary Examiner* — Alison Slater
(74) *Attorney, Agent, or Firm* — Young Basile Hanlon & MacFarlane, P.C.

(57) ABSTRACT

A method for coding a frame of a video stream includes selecting a first initial probability distribution for coding at least a first portion of the frame; updating, to obtain an updated first initial probability distribution and using backward adaptivity, the first initial probability distribution while coding the first portion of the frame; mapping the updated first initial probability distribution to a second initial probability distribution; and coding a second portion of the frame using the second initial probability distribution as an initial probability distribution. The first values of the first initial probability distribution are described using M bits, wherein M is a first positive integer. Second values of the updated first initial probability distribution are described using N bits, where N is a second positive integer that is greater than M. Third values of the second initial probability distribution are described using M bits.

20 Claims, 18 Drawing Sheets

Related U.S. Application Data continuation of application No. 15/798,495, filed on Oct. 31, 2017, now Pat. No. 10,484,695.

(60) Provisional application No. 62/575,716, filed on Oct. 23, 2017.

(51) Int. Cl.

| | | |
|---|---|---|
| *H04N 19/18* | (2014.01) | |
| *H04N 19/129* | (2014.01) | |
| *H04N 19/91* | (2014.01) | |
| *H04N 19/93* | (2014.01) | |
| *H04N 19/147* | (2014.01) | |
| *H04N 19/184* | (2014.01) | |
| *H04N 19/124* | (2014.01) | |
| *H04N 19/159* | (2014.01) | |
| *H04N 19/44* | (2014.01) | |
| *H04N 19/122* | (2014.01) | |

(52) U.S. Cl.
CPC ......... *H04N 19/147* (2014.11); *H04N 19/159* (2014.11); *H04N 19/176* (2014.11); *H04N 19/184* (2014.11); *H04N 19/45* (2014.11); *H04N 19/91* (2014.11); *H04N 19/93* (2014.11); *H04N 19/122* (2014.11)

(56) References Cited

U.S. PATENT DOCUMENTS

| | | | |
|---|---|---|---|
| 9,294,769 B2 | 3/2016 | Jeon et al. | |
| 9,544,597 B1 | 1/2017 | Han et al. | |
| 10,127,913 B1* | 11/2018 | Mokrushin | H03M 7/3079 |
| 10,645,381 B2 | 5/2020 | Joshi et al. | |
| 2011/0293001 A1 | 12/2011 | Lim et al. | |
| 2013/0101036 A1 | 4/2013 | Zhou | |
| 2013/0182773 A1 | 7/2013 | Seregin et al. | |
| 2013/0230097 A1 | 9/2013 | Rojals et al. | |
| 2014/0140400 A1 | 5/2014 | George et al. | |
| 2014/0348247 A1 | 11/2014 | Tsukuba et al. | |
| 2015/0110173 A1 | 4/2015 | Bultje et al. | |
| 2015/0110409 A1 | 4/2015 | Bultje et al. | |
| 2016/0191917 A1* | 6/2016 | Fu | H04N 19/184 |
| | | | 375/240.07 |
| 2018/0176596 A1 | 6/2018 | Jeong et al. | |
| 2018/0199062 A1 | 7/2018 | Zhang et al. | |
| 2019/0124339 A1 | 4/2019 | Young | |
| 2019/0124340 A1 | 4/2019 | Young et al. | |

* cited by examiner

FIG. 13

PROBABILITY MAPPING FOR ENTROPY CODING

CROSS-REFERENCE TO RELATED APPLICATION(S)

This application is a continuation of U.S. application patent Ser. No. 16/659,666, filed Oct. 22, 2019, which is a continuation of U.S. application patent Ser. No. 15/798,495, filed Oct. 31, 2017, which claims priority to and the benefit of U.S. Provisional Application Patent Ser. No. 62/575,716, filed Oct. 23, 2017, the entire disclosures of which are hereby incorporated by reference.

BACKGROUND

Digital video streams may represent video using a sequence of frames or still images. Digital video can be used for various applications including, for example, video conferencing, high definition video entertainment, video advertisements, or sharing of user-generated videos. A digital video stream can contain a large amount of data and consume a significant amount of computing or communication resources of a computing device for processing, transmission, or storage of the video data. Various approaches have been proposed to reduce the amount of data in video streams, including compression and other encoding techniques.

SUMMARY

A first aspect is a method for coding a frame of a video stream. The method includes selecting a first initial probability distribution for coding at least a first portion of the frame; updating, to obtain an updated first initial probability distribution and using backward adaptivity, the first initial probability distribution while coding the first portion of the frame; mapping the updated first initial probability distribution to a second initial probability distribution; and coding a second portion of the frame using the second initial probability distribution as an initial probability distribution. The first values of the first initial probability distribution are described using M bits, wherein M is a first positive integer. Second values of the updated first initial probability distribution are described using N bits, where N is a second positive integer that is greater than M. Third values of the second initial probability distribution are described using M bits.

A second aspect is an apparatus for decoding a frame of a video stream. The apparatus includes a memory and a processor. The processor is configured to select a first initial probability distribution for decoding at least a first portion of the frame; update, to obtain an updated first initial probability distribution, the first initial probability distribution while decoding the first portion of the frame; map the updated first initial probability distribution to a second initial probability distribution; and decode a second portion of the frame using the second initial probability distribution as an initial probability distribution. The first values of the first initial probability distribution are described using M bits, wherein M is a first positive integer. Second values of the updated first initial probability distribution are described using N bits, where N is a second positive integer that is greater than M. The third values of the second initial probability distribution are described using M bits.

A third aspect is a an apparatus for encoding a frame of a video stream. The apparatus includes a memory and a processor. The processor is configured to select a first initial probability distribution for encoding at least a first portion of the frame; update, to obtain an updated first initial probability distribution, the first initial probability distribution while decoding the first portion of the frame; map the updated first initial probability distribution to a second initial probability distribution; and encode a second portion of the frame using the second initial probability distribution as an initial probability distribution. The first values of the first initial probability distribution are described using M bits, wherein M is a first positive integer. Second values of the updated first initial probability distribution are described using N bits, where N is a second positive integer that is greater than M. The third values of the second initial probability distribution are described using M bits.

These and other aspects of the present disclosure are disclosed in the following detailed description of the embodiments, the appended claims and the accompanying figures.

BRIEF DESCRIPTION OF THE DRAWINGS

The description herein makes reference to the accompanying drawings wherein like reference numerals refer to like parts throughout the several views.

FIG. 13 is a diagram of examples of probability mappings according to implementations of this disclosure.

DETAILED DESCRIPTION

Figure 1:
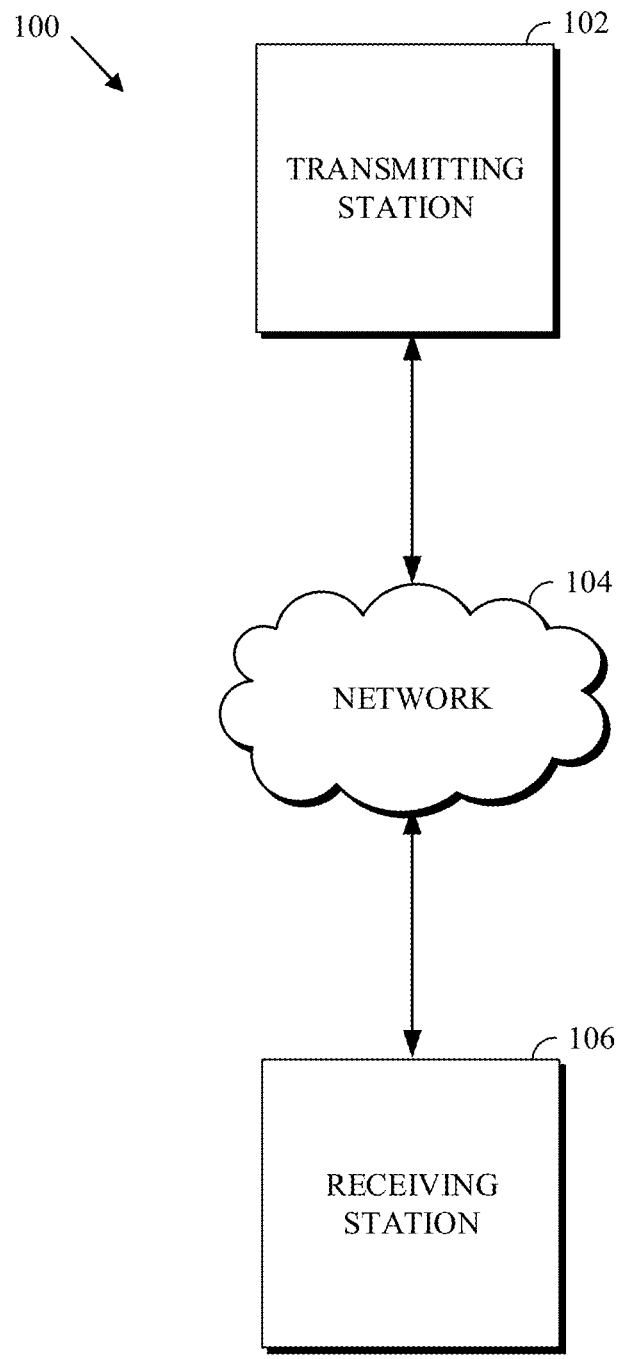
FIG. 1 is a schematic of a video encoding and decoding system.

As mentioned above, compression schemes related to coding video streams may include breaking images into blocks and generating a digital video output bitstream (i.e., an encoded bitstream) using one or more techniques to limit the information included in the output bitstream. A received bitstream can be decoded to re-create the blocks and the source images from the limited information. Encoding a video stream, or a portion thereof, such as a frame or a block, can include using temporal or spatial similarities in the video stream to improve coding efficiency. For example, a current block of a video stream may be encoded based on identifying a difference (residual) between the previously coded pixel values, or between a combination of previously coded pixel values, and those in the current block.

Encoding using spatial similarities can be known as intra prediction. Intra prediction attempts to predict the pixel values of a block of a frame of video using pixels peripheral to the block; that is, using pixels that are in the same frame as the block but that are outside the block. A prediction block resulting from intra prediction is referred to herein as an intra predictor. Intra prediction can be performed along a direction of prediction where each direction can correspond to an intra prediction mode. The intra prediction mode can be signalled by an encoder to a decoder.

Encoding using temporal similarities can be known as inter prediction. Inter prediction attempts to predict the pixel values of a block using a possibly displaced block or blocks from a temporally nearby frame (i.e., reference frame) or frames. A temporally nearby frame is a frame that appears earlier or later in time in the video stream than the frame of the block being encoded. A prediction block resulting from inter prediction is referred to herein as inter predictor.

Inter prediction is performed using a motion vector. A motion vector used to generate a prediction block refers to a frame other than a current frame, i.e., a reference frame. Reference frames can be located before or after the current frame in the sequence of the video stream. Some codecs use up to eight reference frames, which can be stored in a frame buffer. The motion vector can refer to (i.e., use) one of the reference frames of the frame buffer. As such, one or more reference frames can be available for coding a current frame.

As mentioned above, a current block of a video stream may be encoded based on identifying a difference (residual) between the previously coded pixel values and those in the current block. In this way, only the residual and parameters used to generate the residual need be added to the encoded bitstream. The residual may be encoded using a lossy quantization step.

The residual block can be in the pixel domain. The residual block can be transformed into the frequency domain resulting in a transform block of transform coefficients. The transform coefficients can be quantized resulting into a quantized transform block of quantized transform coefficients. The quantized coefficients can be entropy encoded and added to an encoded bitstream. A decoder can receive the encoded bitstream, entropy decode the quantized transform coefficients to reconstruct the original video frame.

Entropy coding is a technique for "lossless" coding that relies upon probability models that model the distribution of values occurring in an encoded video bitstream. By using probability models based on a measured or estimated distribution of values, entropy coding can reduce the number of bits required to represent video data close to a theoretical minimum. In practice, the actual reduction in the number of bits required to represent video data can be a function of the accuracy of the probability model, the number of bits over which the coding is performed, and the computational accuracy of fixed-point arithmetic used to perform the coding.

In an encoded video bitstream, many of the bits are used for one of two things: either content prediction (e.g., inter mode/motion vector coding, intra prediction mode coding, etc.) or residual coding (e.g., transform coefficients).

With respect to content prediction, the bits in the bitstream can include, for a block, the intra prediction mode used to encode the block. The intra prediction mode can be coded (encoded by an encoder and decoded by a decoder) using entropy coding. As such, a context is determined for the intra prediction mode and a probability model, corresponding to the context, for coding the intra prediction mode is used for the coding.

Encoders may use techniques to decrease the amount of bits spent on coefficient coding. For example, a coefficient token tree (which may also be referred to as a binary token tree) specifies the scope of the value, with forward-adaptive probabilities for each branch in this token tree. The token base value is subtracted from the value to be coded to form a residual then the block is coded with fixed probabilities. A similar scheme with minor variations including backward-adaptivity is also possible. Adaptive techniques can alter the probability models as the video stream is being encoded to adapt to changing characteristics of the data. In any event, a decoder is informed of (or has available) the probability model used to encode an entropy-coded video bitstream in order to decode the video bitstream.

As described above, entropy coding a sequence of symbols is typically achieved by using a probability model to determine a probability p for the sequence and then using binary arithmetic coding to map the sequence to a binary codeword at the encoder and to decode that sequence from the binary codeword at the decoder. The length (i.e., number of bits) of the codeword is given by $-\log(p)$. The efficiency of entropy coding can be directly related to the probability model. Throughout this document, log denotes the logarithm function to base two (2) unless specified otherwise.

A model, as used herein, can be, or can be a parameter in, a lossless (entropy) coding. A model can be any parameter or method that affects probability estimation for entropy coding.

A purpose of context modeling is to obtain probability distributions for a subsequent entropy coding engine, such as arithmetic coding, Huffman coding, and other variable-length-to-variable-length coding engines. To achieve good compression performance, a large number of contexts may be required. For example, some video coding systems can include hundreds or even thousands of contexts for transform coefficient coding alone. Each context can correspond to a probability distribution.

A probability distribution can be learnt by a decoder and/or included in the header of a frame to be decoded.

Learnt can mean that an entropy coding engine of a decoder can adapt the probability distributions (i.e., probability models) of a context model based on decoded frames. For example, the decoder can have available an initial probability distribution that the decoder (e.g., the entropy coding engine of the decoder) can continuously update as the decoder decodes additional frames. The updating of the probability models can insure that the initial probability distribution is updated to reflect the actual distributions in the decoded frames.

Including a probability distribution in the header can instruct the decoder to use the included probability distribution for decoding the next frame, given the corresponding context. A cost (in bits) is associated with including each probability distribution in the header. For example, in a coding system that includes 3000 contexts and that encodes a probability distribution (coded as an integer value between 1 and 255) using 8 bits, 24,000 bits are added to the encoded bitstream. These bits are overhead bits. Some techniques can be used to reduce the number of overhead bits. For example, the probability distributions for some, but not all, of the contexts can be included. For example, prediction schemes can also be used to reduce the overhead bits. Even with these overhead reduction techniques, the overhead is non-zero.

As already mentioned, residuals for a block of video are transformed into transform blocks of transform coefficients. The transform blocks are in the frequency domain and one or more transform blocks may be generated for a block of video. The transform coefficients are quantized and entropy coded into an encoded video bitstream. A decoder uses the encoded transform coefficients and the reference frames to reconstruct the block. Entropy coding a transform coefficient involves the selection of a context model (also referred to as probability context model or probability model) which provides estimates of conditional probabilities for coding the binary symbols of a binarized transform coefficient.

Implementations of this disclosure can result in reduced numbers of contexts for coding different aspects of content prediction and/or residual coding. Implementations of this disclosure can reduce the number of probability values associated with a context. As such implementations of this disclosure can have reduced computational and storage complexity without adversely affecting compression performance.

Refined entropy coding is described herein first with reference to a system in which the teachings may be incorporated.

FIG. 1 is a schematic of a video encoding and decoding system 100. A transmitting station 102 can be, for example, a computer having an internal configuration of hardware such as that described in FIG. 2. However, other suitable implementations of the transmitting station 102 are possible. For example, the processing of the transmitting station 102 can be distributed among multiple devices.

A network 104 can connect the transmitting station 102 and a receiving station 106 for encoding and decoding of the video stream. Specifically, the video stream can be encoded in the transmitting station 102 and the encoded video stream can be decoded in the receiving station 106. The network 104 can be, for example, the Internet. The network 104 can also be a local area network (LAN), wide area network (WAN), virtual private network (VPN), cellular telephone network or any other means of transferring the video stream from the transmitting station 102 to, in this example, the receiving station 106.

Figure 2:
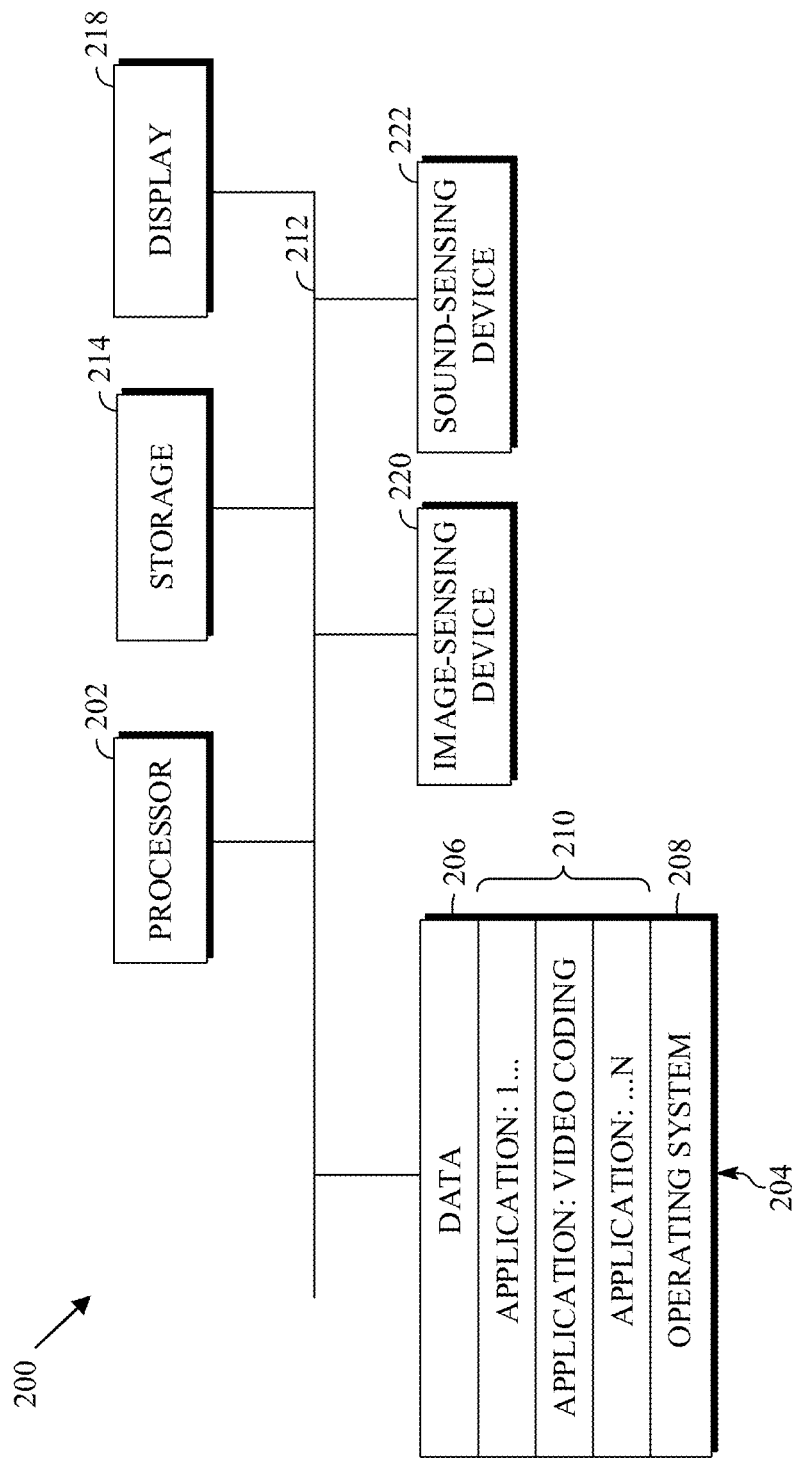
FIG. 2 is a block diagram of an example of a computing device that can implement a transmitting station or a receiving station.

The receiving station 106, in one example, can be a computer having an internal configuration of hardware such as that described in FIG. 2. However, other suitable implementations of the receiving station 106 are possible. For example, the processing of the receiving station 106 can be distributed among multiple devices.

Other implementations of the video encoding and decoding system 100 are possible. For example, an implementation can omit the network 104. In another implementation, a video stream can be encoded and then stored for transmission at a later time to the receiving station 106 or any other device having memory. In one implementation, the receiving station 106 receives (e.g., via the network 104, a computer bus, and/or some communication pathway) the encoded video stream and stores the video stream for later decoding. In an example implementation, a real-time transport protocol (RTP) is used for transmission of the encoded video over the network 104. In another implementation, a transport protocol other than RTP may be used, e.g., an HTTP-based video streaming protocol.

When used in a video conferencing system, for example, the transmitting station 102 and/or the receiving station 106 may include the ability to both encode and decode a video stream as described below. For example, the receiving station 106 could be a video conference participant who receives an encoded video bitstream from a video conference server (e.g., the transmitting station 102) to decode and view and further encodes and transmits its own video bitstream to the video conference server for decoding and viewing by other participants.

FIG. 2 is a block diagram of an example of a computing device 200 that can implement a transmitting station or a receiving station. For example, the computing device 200 can implement one or both of the transmitting station 102 and the receiving station 106 of FIG. 1. The computing device 200 can be in the form of a computing system including multiple computing devices, or in the form of a single computing device, for example, a mobile phone, a tablet computer, a laptop computer, a notebook computer, a desktop computer, and the like.

A CPU 202 in the computing device 200 can be a central processing unit. Alternatively, the CPU 202 can be any other type of device, or multiple devices, capable of manipulating or processing information now-existing or hereafter developed. Although the disclosed implementations can be practiced with a single processor as shown, e.g., the CPU 202, advantages in speed and efficiency can be achieved using more than one processor.

A memory 204 in the computing device 200 can be a read-only memory (ROM) device or a random access memory (RAM) device in an implementation. Any other suitable type of storage device can be used as the memory 204. The memory 204 can include code and data 206 that is accessed by the CPU 202 using a bus 212. The memory 204 can further include an operating system 208 and application programs 210, the application programs 210 including at least one program that permits the CPU 202 to perform the methods described here. For example, the application programs 210 can include applications 1 through N, which further include a video coding application that performs the methods described here. The computing device 200 can also include a secondary storage 214, which can, for example, be a memory card used with a computing device 200 that is mobile. Because the video communication sessions may contain a significant amount of information, they can be stored in whole or in part in the secondary storage 214 and loaded into the memory 204 as needed for processing.

The computing device 200 can also include one or more output devices, such as a display 218. The display 218 may be, in one example, a touch sensitive display that combines a display with a touch sensitive element that is operable to sense touch inputs. The display 218 can be coupled to the CPU 202 via the bus 212. Other output devices that permit a user to program or otherwise use the computing device 200 can be provided in addition to or as an alternative to the display 218. When the output device is or includes a display, the display can be implemented in various ways, including by a liquid crystal display (LCD), a cathode-ray tube (CRT) display or light emitting diode (LED) display, such as an organic LED (OLED) display.

The computing device 200 can also include or be in communication with an image-sensing device 220, for example a camera, or any other image-sensing device 220 now existing or hereafter developed that can sense an image such as the image of a user operating the computing device 200. The image-sensing device 220 can be positioned such that it is directed toward the user operating the computing device 200. In an example, the position and optical axis of the image-sensing device 220 can be configured such that the field of vision includes an area that is directly adjacent to the display 218 and from which the display 218 is visible.

The computing device 200 can also include or be in communication with a sound-sensing device 222, for example a microphone, or any other sound-sensing device now existing or hereafter developed that can sense sounds near the computing device 200. The sound-sensing device 222 can be positioned such that it is directed toward the user operating the computing device 200 and can be configured to receive sounds, for example, speech or other utterances, made by the user while the user operates the computing device 200.

Although FIG. 2 depicts the CPU 202 and the memory 204 of the computing device 200 as being integrated into a single unit, other configurations can be utilized. The operations of the CPU 202 can be distributed across multiple machines (each machine having one or more of processors) that can be coupled directly or across a local area or other network. The memory 204 can be distributed across multiple machines such as a network-based memory or memory in multiple machines performing the operations of the computing device 200. Although depicted here as a single bus, the bus 212 of the computing device 200 can be composed of multiple buses. Further, the secondary storage 214 can be directly coupled to the other components of the computing device 200 or can be accessed via a network and can comprise a single integrated unit such as a memory card or multiple units such as multiple memory cards. The computing device 200 can thus be implemented in a wide variety of configurations.

Figure 3:
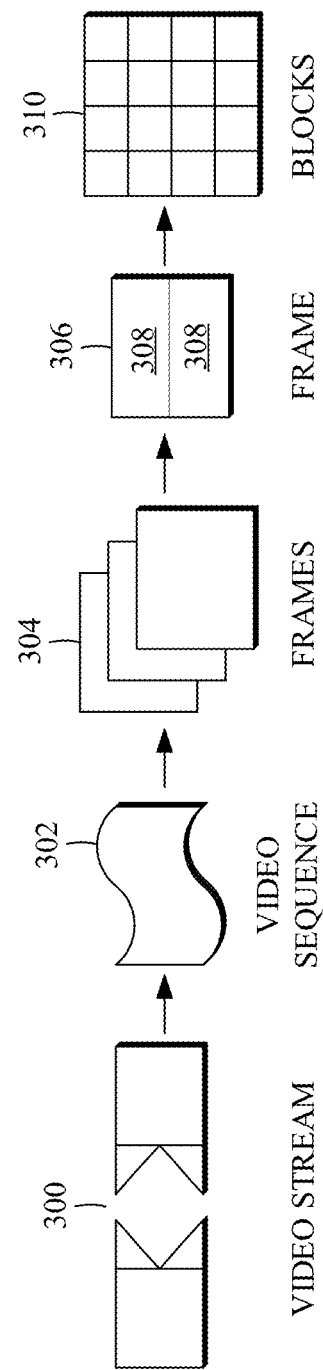
FIG. 3 is a diagram of a video stream to be encoded and subsequently decoded.

FIG. 3 is a diagram of an example of a video stream 300 to be encoded and subsequently decoded. The video stream 300 includes a video sequence 302. At the next level, the video sequence 302 includes a number of adjacent frames 304. While three frames are depicted as the adjacent frames 304, the video sequence 302 can include any number of adjacent frames 304. The adjacent frames 304 can then be further subdivided into individual frames, e.g., a frame 306. At the next level, the frame 306 can be divided into a series of segments 308 or planes. The segments 308 can be subsets of frames that permit parallel processing, for example. The segments 308 can also be subsets of frames that can separate the video data into separate colors. For example, the frame 306 of color video data can include a luminance plane and two chrominance planes. The segments 308 may be sampled at different resolutions.

Whether or not the frame 306 is divided into the segments 308, the frame 306 may be further subdivided into blocks 310, which can contain data corresponding to, for example, 16×16 pixels in the frame 306. The blocks 310 can also be arranged to include data from one or more segments 308 of pixel data. The blocks 310 can also be of any other suitable size such as 4×4 pixels, 8×8 pixels, 16×8 pixels, 8×16 pixels, 16×16 pixels or larger.

Figure 4:
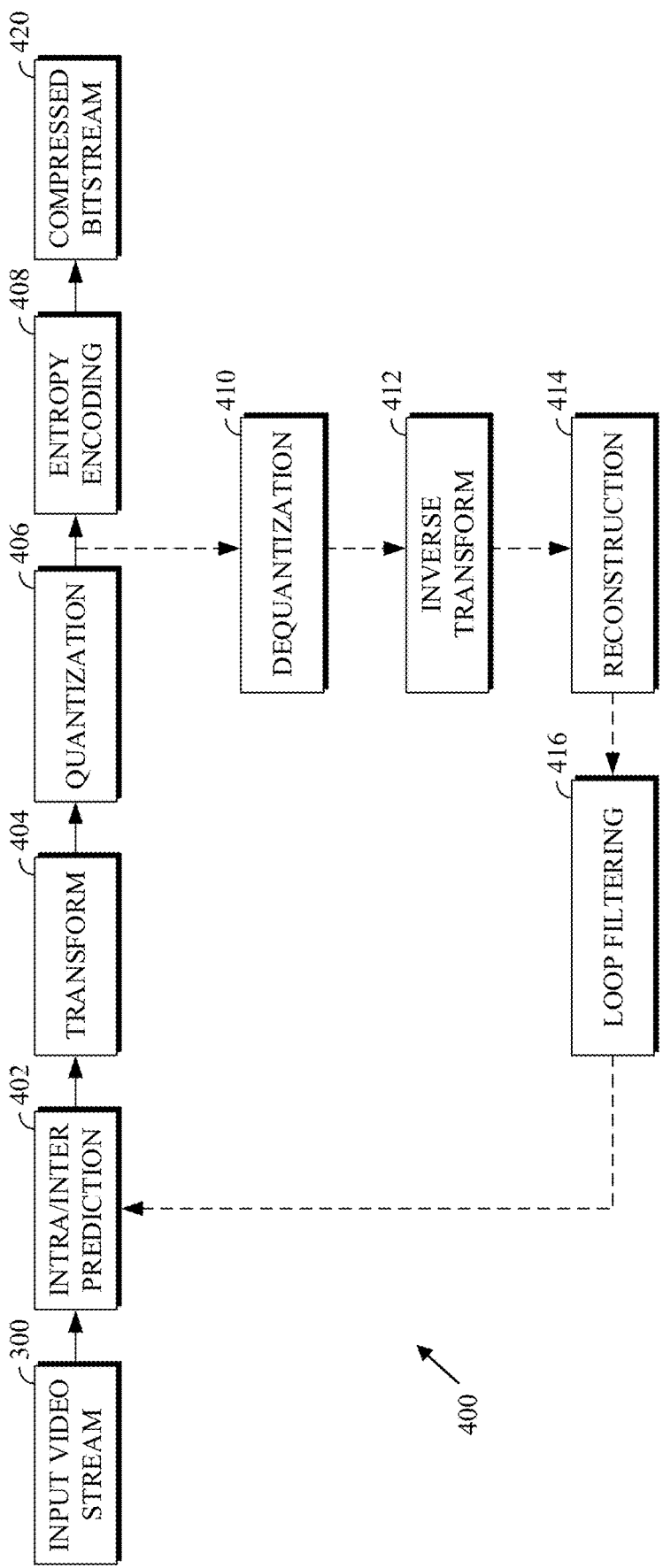
FIG. 4 is a block diagram of an encoder according to implementations of this disclosure.

FIG. 4 is a block diagram of an encoder 400 in accordance with implementations of this disclosure. The encoder 400 can be implemented, as described above, in the transmitting station 102 such as by providing a computer software program stored in memory, for example, the memory 204. The computer software program can include machine instructions that, when executed by a processor such as the CPU 202, cause the transmitting station 102 to encode video data in manners described herein. The encoder 400 can also be implemented as specialized hardware included in, for example, the transmitting station 102. The encoder 400 has the following stages to perform the various functions in a forward path (shown by the solid connection lines) to produce an encoded or compressed bitstream 420 using the video stream 300 as input: an intra/inter prediction stage 402, a transform stage 404, a quantization stage 406, and an entropy encoding stage 408. The encoder 400 may also include a reconstruction path (shown by the dotted connection lines) to reconstruct a frame for encoding of future blocks. In FIG. 4, the encoder 400 has the following stages to perform the various functions in the reconstruction path: a dequantization stage 410, an inverse transform stage 412, a reconstruction stage 414, and a loop filtering stage 416. Other structural variations of the encoder 400 can be used to encode the video stream 300.

When the video stream 300 is presented for encoding, the frame 306 can be processed in units of blocks. At the intra/inter prediction stage 402, a block can be encoded using intra-frame prediction (also called intra-prediction) or inter-frame prediction (also called inter-prediction), or a combination of both. In any case, a prediction block can be formed. In the case of intra-prediction, all or a part of a prediction block may be formed from samples in the current frame that have been previously encoded and reconstructed. In the case of inter-prediction, all or part of a prediction block may be formed from samples in one or more previously constructed reference frames determined using motion vectors.

Next, still referring to FIG. 4, the prediction block can be subtracted from the current block at the intra/inter prediction stage 402 to produce a residual block (also called a residual). The transform stage 404 transforms the residual into transform coefficients in, for example, the frequency domain using block-based transforms. Such block-based transforms include, for example, the Discrete Cosine Transform (DCT) and the Asymmetric Discrete Sine Transform (ADST). Other block-based transforms are possible. Further, combinations of different transforms may be applied to a single residual. In one example of application of a transform, the DCT transforms the residual block into the frequency domain where the transform coefficient values are based on spatial frequency. The lowest frequency (DC) coefficient at the top-left of the matrix and the highest frequency coefficient at the bottom-right of the matrix. It is worth noting that the size of a prediction block, and hence the resulting residual block, may be different from the size of the transform block. For example, the prediction block may be split into smaller blocks to which separate transforms are applied.

The quantization stage 406 converts the transform coefficients into discrete quantum values, which are referred to as quantized transform coefficients, using a quantizer value or a quantization level. For example, the transform coefficients may be divided by the quantizer value and truncated. The quantized transform coefficients are then entropy encoded by the entropy encoding stage 408. Entropy coding may be performed using any number of techniques, including token and binary trees. The entropy-encoded coefficients, together with other information used to decode the block, which may include for example the type of prediction used, transform type, motion vectors and quantizer value, are then output to the compressed bitstream 420. The information to decode the block may be entropy coded into block, frame, slice and/or section headers within the compressed bitstream 420. The compressed bitstream 420 can also be referred to as an encoded video stream or encoded video bitstream, and the terms will be used interchangeably herein.

The reconstruction path in FIG. 4 (shown by the dotted connection lines) can be used to ensure that both the encoder 400 and a decoder 500 (described below) use the same reference frames and blocks to decode the compressed bitstream 420. The reconstruction path performs functions that are similar to functions that take place during the decoding process that are discussed in more detail below, including dequantizing the quantized transform coefficients at the dequantization stage 410 and inverse transforming the dequantized transform coefficients at the inverse transform stage 412 to produce a derivative residual block (also called a derivative residual). At the reconstruction stage 414, the prediction block that was predicted at the intra/inter prediction stage 402 can be added to the derivative residual to create a reconstructed block. The loop filtering stage 416 can be applied to the reconstructed block to reduce distortion such as blocking artifacts.

Other variations of the encoder 400 can be used to encode the compressed bitstream 420. For example, a non-transform based encoder 400 can quantize the residual signal directly without the transform stage 404 for certain blocks or frames. In another implementation, an encoder 400 can have the quantization stage 406 and the dequantization stage 410 combined into a single stage.

Figure 5:
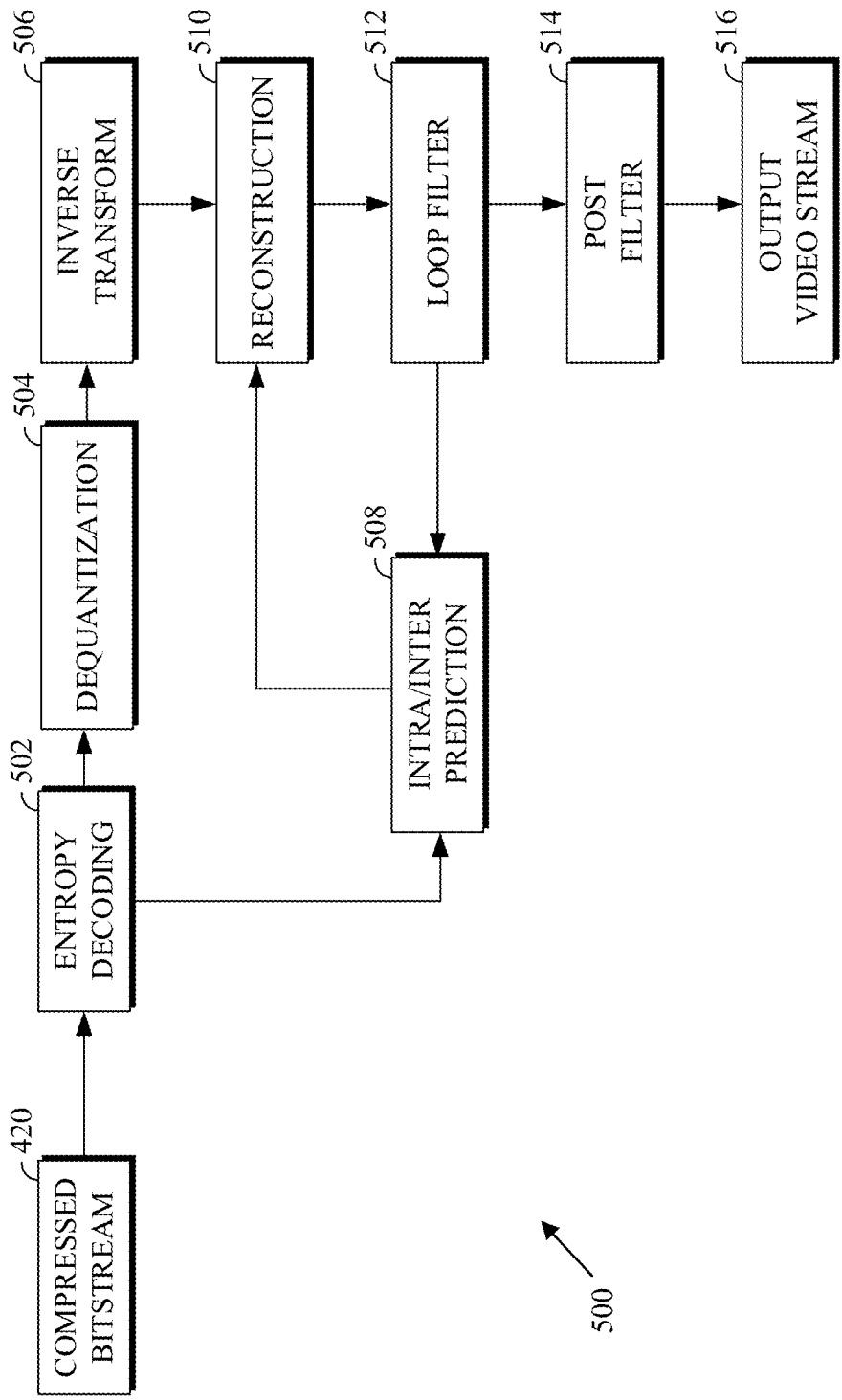
FIG. 5 is a block diagram of a decoder according to implementations of this disclosure.

FIG. 5 is a block diagram of a decoder 500 in accordance with implementations of this disclosure. The decoder 500 can be implemented in the receiving station 106, for example, by providing a computer software program stored in the memory 204. The computer software program can include machine instructions that, when executed by a processor such as the CPU 202, cause the receiving station 106 to decode video data in the manners described below. The decoder 500 can also be implemented in hardware included in, for example, the transmitting station 102 or the receiving station 106.

The decoder 500, similar to the reconstruction path of the encoder 400 discussed above, includes in one example the following stages to perform various functions to produce an output video stream 516 from the compressed bitstream 420: an entropy decoding stage 502, a dequantization stage 504, an inverse transform stage 506, an intra/inter-prediction stage 508, a reconstruction stage 510, a loop filtering stage 512 and a post filtering stage 514. Other structural variations of the decoder 500 can be used to decode the compressed bitstream 420.

When the compressed bitstream 420 is presented for decoding, the data elements within the compressed bitstream 420 can be decoded by the entropy decoding stage 502 to produce a set of quantized transform coefficients. The dequantization stage 504 dequantizes the quantized transform coefficients (e.g., by multiplying the quantized transform coefficients by the quantizer value), and the inverse transform stage 506 inverse transforms the dequantized transform coefficients using the selected transform type to produce a derivative residual that can be identical to that created by the inverse transform stage 412 in the encoder 400. Using header information decoded from the compressed bitstream 420, the decoder 500 can use the intra/inter-prediction stage 508 to create the same prediction block as was created in the encoder 400, e.g., at the intra/inter prediction stage 402. At the reconstruction stage 510, the prediction block can be added to the derivative residual to create a reconstructed block. The loop filtering stage 512 can be applied to the reconstructed block to reduce blocking artifacts. Other filtering can be applied to the reconstructed block. In an example, the post filtering stage 514 is applied to the reconstructed block to reduce blocking distortion, and the result is output as an output video stream 516. The output video stream 516 can also be referred to as a decoded video stream, and the terms will be used interchangeably herein.

Other variations of the decoder 500 can be used to decode the compressed bitstream 420. For example, the decoder 500 can produce the output video stream 516 without the post filtering stage 514. In some implementations of the decoder 500, the post filtering stage 514 is applied after the loop filtering stage 512. The loop filtering stage 512 can include an optional deblocking filtering stage. Additionally, or alternatively, the encoder 400 includes an optional deblocking filtering stage in the loop filtering stage 416.

Some codecs may use level maps to code (i.e., encode by an encoder or decode by a decoder) a transform block. That is, some codecs may use level maps to code the transform coefficients of the transform blocks. In level map coding, the transform block is decomposed into multiple level maps such that the level maps break down (i.e., reduce) the coding of each transform coefficient value into a series of binary decisions each corresponding to a magnitude level (i.e., a map level). The decomposition can be done by using a multi-run process. As such, a transform coefficient of the transform block is decomposed into a series of level binaries and a residue according to the equation:

$$\text{coefficient}[r][c] = \left\{ \left( \sum_{k=0}^{T} \text{level}_k[r][c] \right) + \text{residue}[r][c] \right\} * \text{sign}[r][c]$$

Where $$\text{residue}[r][c] = \text{absolute}(\text{coefficient}[r][c]) - T - 1$$

$$\text{sign}[r][c] = \begin{cases} 1 & \text{if coefficient}[r][c] > 0 \\ -1 & \text{if coefficient}[r][c] < 0 \end{cases}$$

In the above equation, coefficient[r][c] is the transform coefficient of the transform block at the position (row=r, column=c), T is the maximum map level, $\text{level}_k$ is the level map corresponding to map level k, residue is a coefficient residual map, and sign is the sign map of the transform coefficients. These terms are further described below with respect to FIG. 7. The transform coefficients of a transform block can be re-composed using the same equation, such as by a decoder, from encoded $\text{level}_k$ maps, residual map residue, and sign map sign.

A zeroth run can be used to determine a non-zero map (also referred to as a level-0 map) which indicates which transform coefficients of the transform block are zero and which are non-zero. Level maps corresponding to runs 1 through a maximum (i.e., threshold) level T (i.e., level-1 map, level-2 map, . . . , level-T map) are generated in ascending order from level 1 to the maximum map level T.

The level map for level k, referred to as the level-k map, indicates which transform coefficients of the transform block have absolute values greater to or equal to k. The level maps are binary maps. A final run generates a coefficients residue map. If the transform block contains transform coefficient values above the maximum map level T, the coefficients residue map indicates the extent (i.e., residue) that these coefficients are greater than the maximum map level T.

When generating (i.e., coding) the level-k map, only the positions (r, c) corresponding to positions (r, c) of the level-(k–1) map which are equal to 1 (i.e., $level_{k-1}[r][c]=1$) need be processed—other positions of the level-(k–1) are determined to be less than k and, therefore, there is no need to process them for the level-k map. This reduces processing complexity and reduces the amount of binary coding operations.

As the level maps contain binary values, the above and left neighbors of a value to be encoded are binary values. A context model based on the binary values of any number of previously coded neighbors can be determined. The context model can fully utilize information from all these neighbors. The previously coded neighbors can be neighbors in the same level map or a preceding level map, such as an immediately preceding level map. The immediately preceding map of the level-k (e.g., level-2) map is the level-(k–1) (e.g., level-1) map. Contexts according to this disclosure can be less complex thereby resulting in efficient models for coding the level maps.

When encoding a level-k map, the fully coded level-(k–1) map and the partially coded level-k map can be used as context information for context modeling. As compared to transform coefficient coding of other video systems, which code one coefficient value at a time before moving to next transform coefficient, implementations of this disclosure can reduce the cardinality of the reference sample set. This is so because, as further described herein, the information from the level-(k–1) map and partially coded level-k map are binary information. The binary information enables the use of sophisticated spatial neighboring templates for context modeling binary information. Such spatial neighboring templates can better capture statistical characteristics of transform blocks, especially those with larger transform block sizes.

Figure 6:
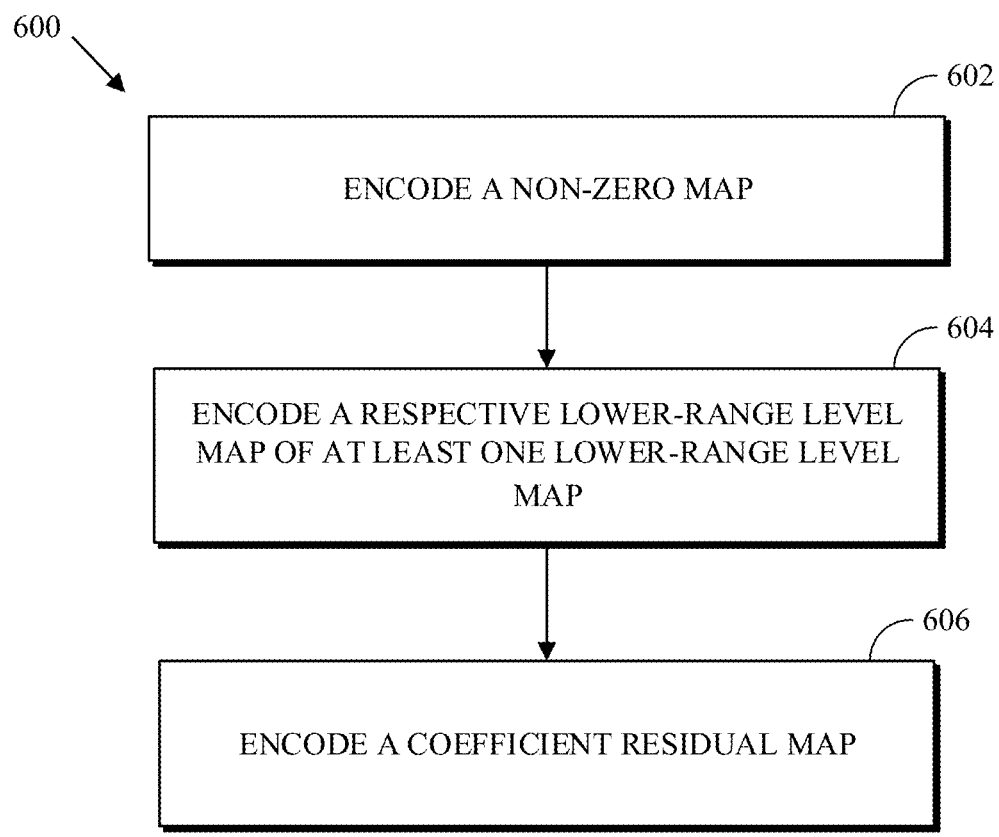
FIG. 6 is a flowchart diagram of a process for encoding a transform block in an encoded video bitstream using level maps according to an implementation of this disclosure.

FIG. 6 is a flowchart diagram of a process 600 for encoding a transform block in an encoded video bitstream using level maps according to an implementation of this disclosure. The process 600 can be implemented in an encoder such as the encoder 400. The encoded video bitstream can be the compressed bitstream 420 of FIG. 4.

The process 600 can be implemented, for example, as a software program that can be executed by computing devices such as transmitting station 102. The software program can include machine-readable instructions that can be stored in a memory such as the memory 204 or the secondary storage 214, and that can be executed by a processor, such as CPU 202, to cause the computing device to perform the process 600. In at least some implementations, the process 600 can be performed in whole or in part by the entropy encoding stage 408 of the encoder 400.

The process 600 can be implemented using specialized hardware or firmware. Some computing devices can have multiple memories, multiple processors, or both. The steps or operations of the process 600 can be distributed using different processors, memories, or both. Use of the terms "processor" or "memory" in the singular encompasses computing devices that have one processor or one memory as well as devices that have multiple processors or multiple memories that can be used in the performance of some or all of the recited steps.

Figure 7:
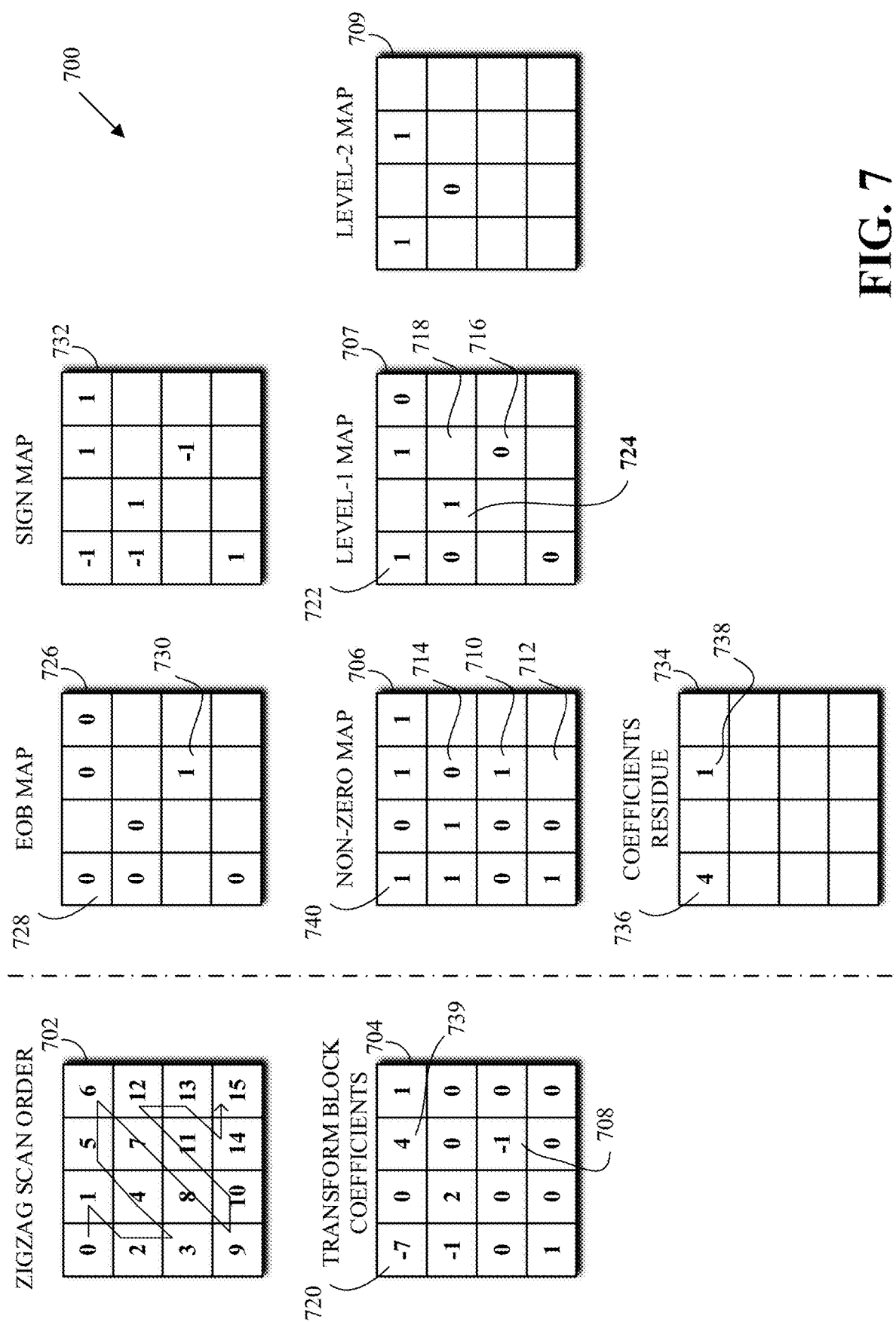
FIG. 7 is a diagram illustrating the stages of transform coefficient coding using level maps in accordance with implementations of this disclosure.

The process 600 is now explained with reference to FIG. 7. FIG. 7 is a diagram illustrating the stages 700 of transform coefficient coding using level maps in accordance with implementations of this disclosure. FIG. 7 includes the zigzag forward scan direction 702, a transform block 704, a non-zero map 706, a level-1 map 707, a level-2 map 709, an end-of-block map 726, a sign map 732, and a coefficient residual map 734.

The process 600 can receive a transform block, such as the transform block 704 of FIG. 7. The transform block can be received from the quantization step of an encoder, such as the quantization stage 406 of the encoder 400 of FIG. 4. The transform block 704 includes zero and non-zero transform coefficients. Some of the non-zero coefficients may be negative values.

At 602, a non-zero map is encoded. The non-zero map indicates positions of the transform block that contain non-zero transform coefficients. The non-zero map can also be referred to as the level-0 map.

The non-zero map 706 of FIG. 6 illustrates a non-zero map. The non-zero map can be generated by traversing the transform block 704 in a scan direction, such as the zigzag forward scan direction 702 of FIG. 7, and indicating in the non-zero map 706, using binary values, whether the corresponding transform coefficient is a zero or a non-zero. In the non-zero map 706, a non-zero transform coefficient of the transform block 704 is indicated with the binary value 1 (one) and a zero transform coefficient is indicated with the binary value 0 (zero). However, the indication can be reversed (i.e., a zero to indicate a non-zero transform coefficient and one (1) to indicate a zero transform coefficient).

In an implementation, zero transform coefficients that are beyond (i.e., come after) the last non-zero transform coefficient, based on the scan direction of the transform block, are not indicated in the non-zero map. For example, using the zigzag forward scan direction 702 to scan the transform block 704, the last non-zero transform coefficient 708, corresponding to scan direction location 11, is the last indicated transform coefficient in the non-zero map 706 at last non-zero coefficient 710. No values are indicated in the non-zero map 706 for the transform coefficients corresponding to the scan positions 12-15 of the zigzag forward scan direction 702.

At 604, the process 600 encodes a respective lower-range level map. Each lower-range map has a map level up to a maximum map level. A lower-range level map indicates which values of the non-zero transform coefficients are equal to the map level of the lower-range map and which values of the non-zero transform coefficients are greater than the map level.

For each map level k, up to the maximum map level T, a lower-range level map $level_k$ is encoded. Each lower-range level map indicates which values of the transform block are equal to the map level of the lower-range level map and which values of the transform block are greater than the map level. As such, the process 600, using multiple runs (i.e., each run corresponding to a level k=1, 2, . . . , T), breaks down the coding of transform coefficients into a series of binary decisions each corresponding to a magnitude level. The binary decision of a coefficient at row and column (r, c) in the transform block at level k can be defined by:

$$\text{level}_k[r][c] = 1 \text{ if absolute}(\text{coefficient}[r][c]) > k$$
$$= 0 \text{ if absolute}(\text{coefficient}[r][c]) \leq k$$

For example, for k=1 (i.e., for the level-1 map 707), the process 600 determines for each transform coefficient of the transform block 704 whether the absolute value of the transform coefficient is greater than k (i.e., 1) or less than or equal to k. For the transform coefficient 720 (i.e., at r=0, c=0), as the absolute value of −7 (i.e., |−7|=7) is greater than 1, the process 600 sets the corresponding value 722 of the level-1 map 707 to 1. For the last non-zero transform coefficient 708 (i.e., at r=2, c=2), as the absolute value of −1 (i.e., |−1|=1) is equal to k (i.e., 1), the process 600 sets the corresponding value 716 of the level-1 map 707 to 0. The last non-zero transform coefficient in the transform block (e.g., the last non-zero transform coefficient 708) can be referred to as the highest AC coefficient).

In an implementation, to generate a lower-level map, the process 600 can scan the preceding level map backwards starting at the last 1 value of the previous level map. For a level-k map, the preceding level map is the level-(k−1) map corresponding to the preceding map level (k−1). That is, for k=2, the preceding level map is the level-1 map. For k=1, the preceding level map is the level-0 map (i.e., the non-zero map). For the level-1 map 707, scanning of the non-zero map 706 starts at the last non-zero coefficient 710. For the level-2 map 709, scanning of the level-1 map 707 starts at the last non-zero coefficient 724. In generating a level-k map, the process 600 need only process the transform coefficients corresponding to 1 values in the level-(k−1). The process 600 need not process the transform coefficients corresponding to non 1 values as those values are already determined to either be equal to k−1 (i.e., the zero values of the level-(k−1) map) or are less than k−1 (i.e., the blank values of the level-(k−1) map).

In an implementation, the maximum map level T can be fixed. For example, the maximum map level T can be provided as a configuration to the process 600, the maximum map level T can be hard-coded in a program that implements the process 600, or the maximum map level T can be set statistically or adaptively based on previously coded transform blocks or other blocks of the encoded video bitstream. Alternatively, the maximum map level T is determined by the process 600. That is, the process 600 can test different values for the maximum map level T (i.e., T=1, 2, 3, 4, . . . ) and determine which value provides the best compression performance. The value of the maximum map level T that results in the best compression can be encoded in the video bitstream, which a decoder, such as the decoder 500 of FIG. 5 can decode and use. A maximum map level T of 2 or 3 has been determined to provide acceptable compression as compared to other values for the maximum map level T.

At 606, the process 600 encodes a coefficient residual map. Each residual coefficient of the coefficient residual map corresponds to a respective (i.e., co-located) non-zero transform coefficient of the transform block having an absolute value exceeding the maximum map level. The residual coefficient for a transform coefficient at location (r, c) of the transform block can be calculated using the formula (1):

$$\text{residue}[r][c] = \text{absolute}(\text{coefficient}[r][c]) - T - 1 \quad (1)$$

FIG. 7 illustrates a coefficients residue map 734. In the example of FIG. 7, the maximum map level T is equal to two (2). As such, the coefficients residue map 734 contains the residuals of the transform coefficients of the transform block 704 the absolute values of which are greater than 2. A residual coefficient is the extent to which the absolute value of a transform coefficient exceeds the maximum map level T. The absolute values of two values of the transform block 704 are greater than the value of the maximum map level T (i.e., 2), namely the transform coefficient 720 (i.e., |−7|=7>2) and transform coefficient 739 (i.e., |4|=4>2). Respectively, the coefficients residue map 734 includes residual 736 and residual 738. Using the formula (1), the residual 736 is set to 5 (i.e., absolute(−7)−3=4) and the residual 738 is set to 1 (i.e., absolute(4)−3=1).

The residual coefficients of the coefficients residue map 734 can be encoded in the encoded video bitstream using binary coding. A probability distribution that fits the statistics of the residual coefficients of the coefficients residue map can be used. The probability distribution can be a geometric distribution, a Laplacian distribution, a Pareto distribution, or any other distribution.

Encoding the residual coefficients in the encoded video bitstream provides several benefits, such as over video coding systems that encode the transform coefficients. As each residual coefficient is smaller in magnitude than its corresponding transform coefficient, less bits are required to encode the residual coefficient. Additionally, as there are fewer residual coefficients to encode (e.g., 2 in the coefficient residual map 734 of FIG. 7) than non-zero transform coefficients (e.g., 7 in the transform block 704 of FIG. 7), additional compression can result.

In an implementation of the process 600, a sign map can also be encoded. A sign map indicates which transform coefficients of the transform block have positive values and which transform coefficients have negative values. Transform coefficients that are zero need not be indicated in the sign map. The sign map 732 of FIG. 7 illustrates an example of a sign map for the transform block 704. In the sign map, negative transform coefficients are indicated with a −1 and positive transform coefficients are indicated with a 1. In some implementations, the sign of a positive coefficient may be indicated with a 0 and the sign of a negative coefficient may be indicated with a 1.

In an implementation of the process 600, encoding a non-zero map, at 602, can also include generating an end-of-block map for the transform block and interleaving the non-zero map and the end-of-block map in the encoded video bitstream.

The end-of-block map indicates whether a non-zero transform coefficient of the transform block is the last non-zero coefficient with respect to a given scan direction. If a non-zero coefficient is not the last non-zero coefficient in the transform block, then it can be indicated with the binary value 0 (zero) in the end-of-block map. If, on the other hand, a non-zero coefficient is the last non-zero coefficient in the transform block, then it can be indicated with the binary value 1 (one) in the end-of-block map.

For example, as the transform coefficient 720 of the transform block 704 is followed by another non-zero transform coefficient (e.g., the transform coefficient −1 corresponding to scan location 2), the transform coefficient 720 is not the last non-zero transform coefficient, it is indicated with the end-of-block value 728 of zero. On the other hand, as the transform coefficient corresponding to the scan location 11 (i.e., the last non-zero transform coefficient 708) is the last non-zero coefficient of the transform block 704, it is indicated with the end-of-block value 730 of 1 (one).

The process 600 can, by traversing the non-zero map and the end-of-block maps in a same scan direction, interleave values from the non-zero map 706 and the end-of-block map

726 in the encoded bitstream. The process 600 can use the zigzag forward scan direction 702 or any arbitrary scan direction. For each position (r, c), the value at that row and column of the non-zero map 706 (i.e., nz_map[r][c]) is coded first. If the value nz_map[r] [c] is 1, then the corresponding value from the end-of-block map 726 (i.e., eob_map[r] [c]) is coded next to indicate whether the position (r, c) of the transform block 704 contains the last nonzero transform coefficient. The process 600 ends the coding of the non-zero map (e.g., the non-zero map 706) when eob_map [r][c] equals to 1 or when the last position in the transform block (e.g., the scan position 15 of the zigzag forward scan direction 702) is reached. That is, when encoding a value of 1 from the non-zero map 706, the value is followed by another syntax element (i.e., a value to be encoded in the encoded video bitstream) from a corresponding (i.e., co-located) end-of-block map 726 value to indicate whether the 1 value is the last 1 value of the non-zero map 706.

In an implementation, encoding a non-zero map, at 602, can also include determining a coding context for a value (i.e., to-be-coded value) of the non-zero map. The coding context of a to-be-coded value at a current position (r, c) can be based on previously coded non-zero neighboring values of the to-be-coded value in the non-zero map. The coding context can also be based on the position of the to-be-coded value within the non-zero map.

As mentioned above, the context information can be determined based on the number of non-zero previously coded neighbors of the current position and can be calculated using the sum $$\text{non\_zero\_map\_sum}(r,c) = \Sigma_{(r',c') \in nb(r,c)} nz\_\text{map}(r',c') \qquad (2)$$

In equation (2), non_zero_map_sum(r, c) is the number of non-zero previously coded neighbors of the to-be-coded value of the non-zero block at position (r, c), nb(r,c) is the set of previously coded neighbors of the to-be-coded value at location (r,c) of the non-zero map, and nz_map(r', c') is the value at position (r', c') in the non-zero map. Equation (1) is further explained with reference to FIG. 8.

Figure 8:
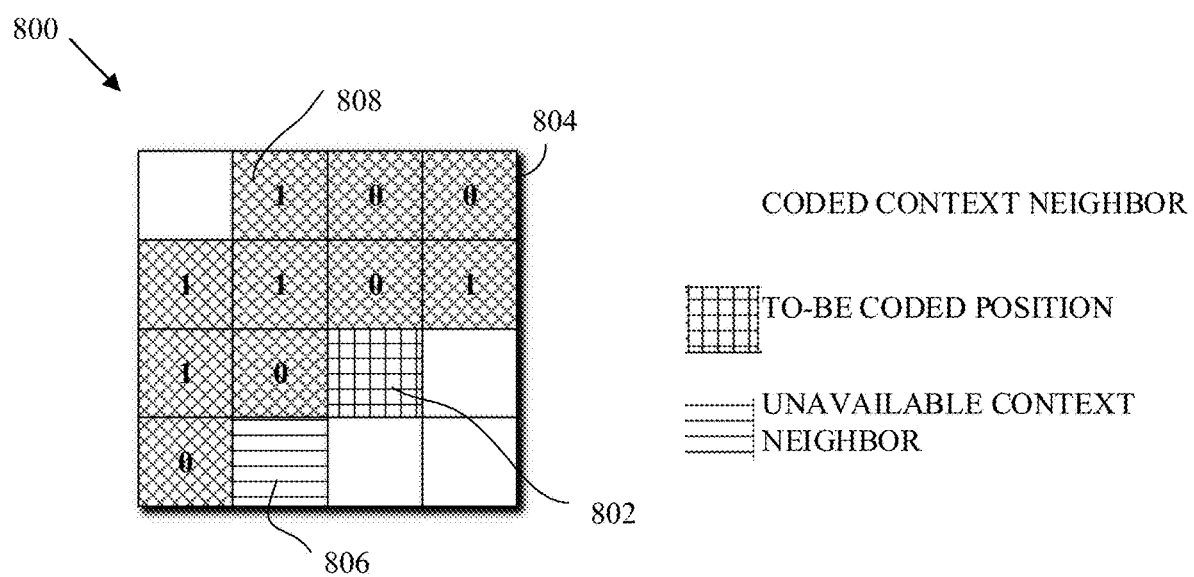
FIG. 8 is a diagram of previously coded neighbors in a non-zero map according to an implementation of this disclosure.

FIG. 8 is a diagram of previously coded neighbors in a non-zero map 800 according to an implementation of this disclosure. FIG. 8 includes a to-be-encoded value, current value 802, an unavailable context neighbor 806 (i.e., a neighboring value for which context information is not available), and coded context neighbors, such as coded context neighbor 808. Ten coded context neighbors are illustrated. Which values are included in the set of neighbors depends on the scan direction. For example, using the zigzag forward scan direction 702 of FIG. 7, the set of neighbors illustrated in FIG. 8 includes the coded context neighbors 808 which includes neighbors that are above and to the left of the current value 802. For the current value 802, non_zero_map_sum(2,2)=5. This value (i.e., 5) can be used as context information to determine a probability model for coding the current value 802 of the non-zero map 800.

As indicated above, the coding context can also be based on the position of the to-be-coded value within the non-zero map or, equivalently, in the transform block. The positions of the transform block can be grouped into context groups. For example, four context groups can be set: a first group corresponding to the DC coefficient (i.e., r=0 and c=0), a second group corresponding to the top row except for the AC coefficient (i.e., r=0 and c>0), a third group corresponding to the left-most column except for the AC coefficient (i.e., r>0 and c=0), and a fourth group corresponding to all other coefficients (i.e., r>0 and c>0). As such, the current value 802 corresponds to the fourth context group.

In an implementation, encoding a non-zero map, at 602, can also include determining a coding context for each value of the end-of-block map. The process 600 can determine a context model for a to-be-encoded value of the end-of-block map based on the location of the to-be-encoded value with respect to the frequency information of the transform block. That is, the position of the transform coefficient in the transform block can be used as the context for determining the context model for encoding a corresponding (i.e., co-located) to-be-encoded value of the end-of-block map. The transform block can be partitioned into areas such that each area corresponds to a context. The partitioning can be based on the rationale that the likelihood is very low that the end-of-block is at the DC location of the transform block but that the likelihood increases further from the DC coefficient.

In some implementations, a lower-range level map can be a binary map having dimensions corresponding to the dimensions of the transform block and, as indicated above, a map level k. A position of the lower-range level map can be set to one (1) when a corresponding value in the preceding level map (i.e., level map k−1 as described below) is one (1) and the corresponding transform coefficient is greater than the map level k of the lower-range level map. A position of the lower-range level map can be set to a value of zero when a corresponding value in the preceding level map has a value of one and the corresponding transform coefficient is equal to the map level k of the lower-range level map. A position of the lower-range level map can have no value when a corresponding value in the preceding level map has a value of zero.

In an implementation of the process 600, encoding a lower-range level map for a level, at 604, can also include determining, based on a scan direction of the lower-range level map, a level-map coding context for a value of the lower-range level map. As indicated above, encoding a value of a lower-range level map k amount to encoding a binary value, namely whether the corresponding (i.e., co-located) transform coefficient of the transform block is equal k or is above k. The encoding of binary values results in simple contexts. As such, multiple neighboring values of a value can be used as the context for determining a context model for the value.

As also indicated above, scanning of the lower-range level map can proceed in a backwards scan direction. As such, when encoding a value, neighboring values below and to the right of the to-be-encoded value (if, for example, the scan direction is the zigzag forward scan direction or 702 of FIG. 7) will have already been encoded. Therefore, first neighboring values (e.g., below and right neighboring values) in the lower-range level map can be used as context. Additionally, second neighboring values (e.g., top and left neighboring values) in the immediately preceding level-(k−1) map can also be used as context. The preceding level map of a lower-range level-k map is the lower-range level-(k−1) map, for k>2; and the preceding level map for the level-1 map is the non-zero map.

As described above, the coding of the transform coefficients is a multi-pass process. In the first pass, the non-zero map 706, which describes the locations of non-zero coefficients in the transform block, is coded following the forward scan direction. In subsequent passes, the values of the non-zero coefficients following the backward scan direction (i.e., from the position of the highest AC coefficient to the position of the DC coefficient) are coded. Coding the non-zero map 706 can be implemented using the steps:

1. Initialize i=0, where i denotes the scan position, and i=0 corresponds to the DC position (e.g., the transform coefficient 720).
2. Code a binary non-zero flag nz[i] indicating whether the quantized transform coefficient at scan position i is zero. For example, a zero value (nz[i]=0) can be coded when the quantized transform coefficient is zero (i.e., the value in the non-zero map 706 at scan position i is zero); otherwise (the value in the non-zero map 706 at scan position i is 1), a one value (nz[i]=1) is coded. In another example, a zero value (nz[i]=0) can be coded when the quantized transform coefficient is not zero; otherwise, a one value (nz[i]=1) is coded.
3. If nz[i] indicates that the transform coefficient at scan position i is non-zero (e.g., nz[i]=1), then code a binary flag indicating whether all the coefficients at scan positions higher than i are all zero. That is, when a 1 value of the non-zero map 706 is coded, then a value at the same scan position in the end-of-block map 726 is then coded.
4. Set i to the next scan position (i=i+1).
5. Repeat Steps 2-4 until EOB is met (i.e., until the end-of-block value 730 is coded).
6. Set nz[j]=0 for all j>EOB. That is, set all transform coefficients after the end-of-block value 730 to 0.

During the quantization process, such as described with respect to the quantization stage 406 of FIG. 4, a rate distortion optimized quantization (RDOQ) process determines (e.g., calculates, selects, etc.), for transform coefficients of a transform block, respective quantized transform coefficients according to a rate distortion cost of each of the quantized transform coefficients.

For example, in response to receiving a transform coefficient value x, the RDOQ may initially provide a quantized transform coefficient Q(x). The quantized transform coefficient Q(x) may be first obtained by minimizing the distortion (e.g., a loss in video quality). However, when the RDOQ considers the rate (e.g., a number of bits) of coding the quantized transform coefficient Q(x) in addition to the distortion, the RDOQ may obtain another quantized transform coefficient Q'(x) that provides a better overall rate distortion cost. This process can continue until an optimal quantized transform coefficient is obtained for the transform coefficient value x. As such, the quantized coefficient value of a transform coefficient may change during the coding process of the transform coefficient and/or the transform block that includes the transform coefficient.

As described above, coding the non-zero map 706 uses a forward scan direction and coding the subsequent level maps uses a backward scan. As such, estimating the rate cost of changing a transform coefficient value can be difficult since the first pass and the second (or a subsequent) pass of coding use different scan directions: one forward and one backward.

More specifically, in the first pass where the scan direction is forward (from the DC coefficient to the highest AC coefficient), a change to the quantized coefficient value at scan position i can impact the rate cost of coding coefficients at scan positions j that follow the scan position i (i.e., j>i); and in the second pass, where the scan direction is backward (from the highest AC coefficient to the DC coefficient), a change to the quantized coefficient at scan position i can impact the rate cost of coding coefficients at scan positions j' that precede the scan position i (i.e., j'<i).

As such, to estimate the cost of coding a coefficient at scan position i, information from transform coefficients at scan positions j>i and transform coefficients at scan positions j'<i are required thereby creating a bi-directional dependency. This bi-directional dependency may significantly complicate the RDOQ process.

To avoid the bi-directional dependency, implementations according to this disclosure can, instead of interleaving EOB indications (i.e., end-of-block values of the end-of-block map 726) after non-zero values of the non-zero map 706, first code the EOB symbol and proceed to process the non-zero map 706 in a backward scan direction. As such, backward scan directions can be used for all passes of the coding of the transform block using level maps. By using backward scan directions in all passes, only information from transform coefficients at scan positions j following the scan position of a current transform coefficient i (i.e., j>i) are required for estimating the rate cost of coding the coefficient at scan position i. As such, complexity is reduced, which in turns leads to more efficient implementation of the RDOQ. Accordingly, coding a transform block using level maps can be implemented using the steps:

1. Code EOB.
2. Set nz[j]=0 for all j>EOB, and set nz[EOB]=1. Terminate the process if EOB<1.
3. Initialize i=EOB-1.
4. Code nz[i] indicating whether the quantized transform coefficient at scan position i is zero (nz[i]=0) or not (nz[i]=1).
5. Set i=i−1.
6. Repeat Steps 3-5 until i=−1.

In the above steps, the EOB is as described with respect to FIGS. 6-7. That is the EOB indicates the location of the last non-zero coefficient of the transform block. However, other semantics for the EOB are possible. For example, in an implementation, the EOB can indicate the location immediately after the last non-zero coefficient of the transform block. As such, and referring to FIG. 7 for illustration, the EOB would indicate the scan position 12 (instead of the scan position 11 as described with respect to FIGS. 6-7).

When the EOB indicates the position immediately after the last non-zero coefficient, then the steps above can be given by the following:

1. Code EOB.
2. Set nz[j]=0 for all j≥EOB, and set nz[EOB−1]=1. Terminate the process if EOB≤1.
3. Initialize i=EOB−2.
4. Code nz[i] indicating whether the quantized transform coefficient at scan position i is zero (nz[i]=0) or not (nz[i]=1).
5. Set i=i−1.
6. Repeat Steps 3-5 until i=−1.

Figure 9:
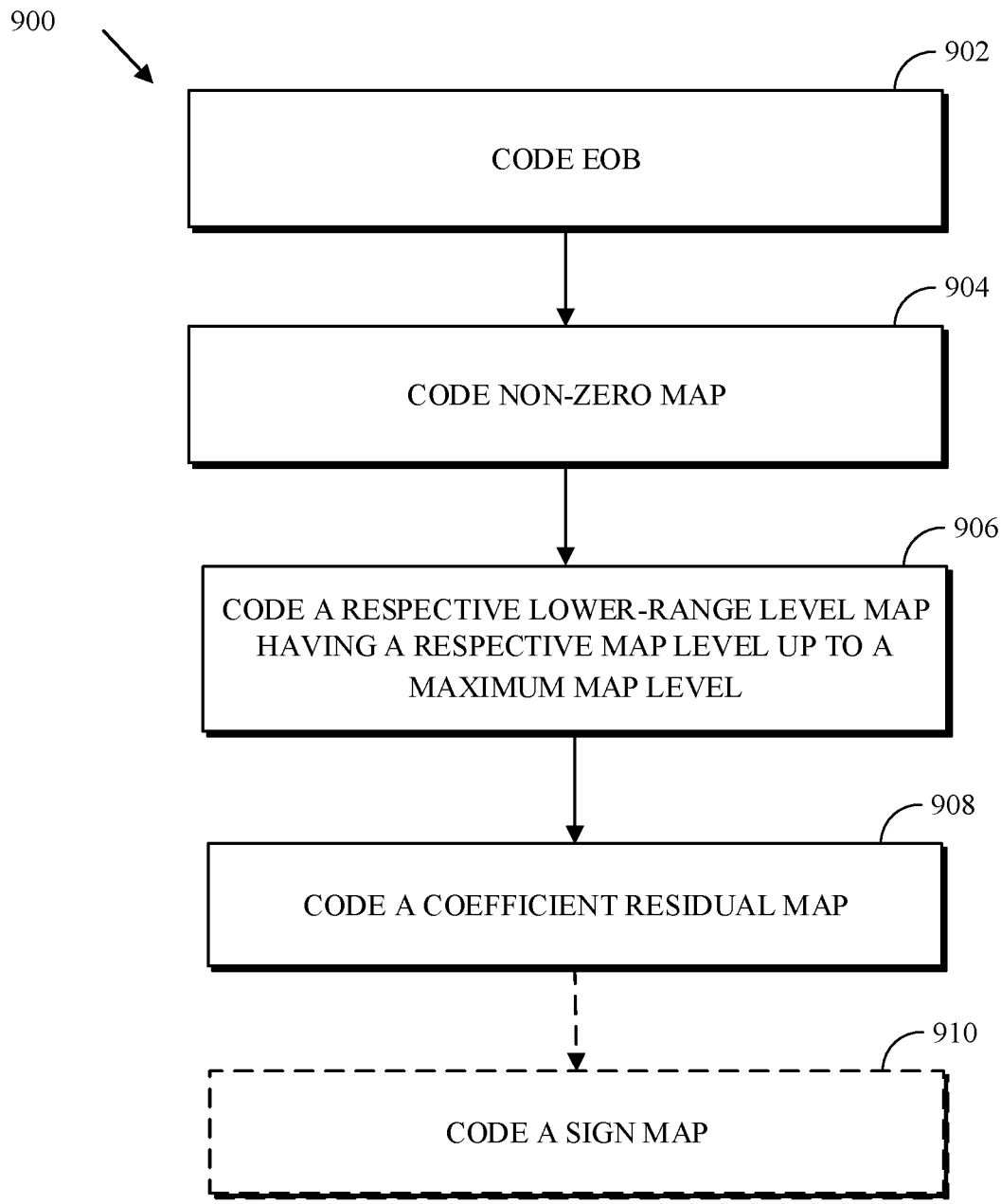
FIG. 9 is a flowchart diagram of a process for coding a transform block using level maps according to an implementation of this disclosure.

FIG. 9 is a flowchart diagram of a process 900 for coding a transform block using level maps according to an implementation of this disclosure. The process 900 can be implemented by an encoder such as the encoder 400 of FIG. 4. When implemented by an encoder, coding means encoding in an encoded bitstream, such as the compressed bitstream 420 of FIG. 4. For example, the process 900 can be performed in whole or in part by the entropy encoding stage 408 of the encoder 400. The process 900 can be performed by a decoder such as the decoder 500 of FIG. 5. When implemented by a decoder, coding means decoding from an encoded bitstream, such as the compressed bitstream 420 of FIG. 5. For example, the process 900 can be performed in whole or in part by the entropy decoding stage 502 of the decoder 500 and the encoded video bitstream can be the compressed bitstream 420 of FIG. 5.

Implementations of the process 900 can be performed by storing instructions in a memory such as the memory 204 of the receiving station 106 to be executed by a processor such as CPU 202, for example.

The process 900 can be implemented using specialized hardware or firmware. Some computing devices can have multiple memories, multiple processors, or both. The steps or operations of the process 900 can be distributed using different processors, memories, or both. For simplicity of explanation, the process 900 is depicted and described as a series of steps or operations. However, the teachings in accordance with this disclosure can occur in various orders and/or concurrently. Additionally, steps in accordance with this disclosure may occur with other steps not presented and described herein. Furthermore, not all illustrated steps or operations may be used to implement a method in accordance with the disclosed subject matter.

At 902, the process 900 codes an end-of-block indicator of the transform block. In an implementation, the scan position of the EOB can be coded. For example, and referring to FIG. 7, the scan position 11 corresponding to the last non-zero transform coefficient 708 can be coded. In another example, the scan position 12, corresponding to the coefficient following the last non-zero transform coefficient 708 in the forward scan order, is coded. In an implementation, the end-of-block indicator can be coded using a context model.

At 904, the process 900 codes the non-zero map in the backward scan direction starting at the last non-zero coefficient of the transform block. The non-zero map indicates which transform coefficients of a transform block have a zero value and which transform coefficients of the transform block have a non-zero value. The process 900 codes the non-zero map that is similar to the non-zero map 706 of FIG. 7. The process 900 codes a binary value indicating whether a quantized transform coefficient at a scan order is zero or non-zero. For example, for a scan position i, the process 900 can code a zero if the quantized transform coefficient at the scan position i is zero; otherwise a 1 is coded.

At 906, the process 900 codes a respective lower-range level map having a respective map level up to a maximum map level T. A lower-range level map having a respective map level indicates which transform coefficients of the transform block are equal, in absolute value, to the respective map level and which transform coefficients of the transform block are, in absolute value, greater than the respective map level. When implemented by a decoder, the process 900 decodes values from the encoded video bitstream to reconstruct lower-range level-k maps encoded as described with respect to 604 of the process 600.

For example, to reconstruct a level-1 map, the process 900 starts from the highest non-zero transform coefficient traversing backwards to determine which of transform coefficients are equal to 1 and which are greater than 1. That is, using the reconstructed non-zero map of the non-zero map 706 of FIG. 7, and starting at the last non-zero coefficient 710 and traversing backwards to the value 740, the process 900 reconstructs the level-1 map 707 of FIG. 7. For each 1 value of the reconstructed non-zero map, the process 900 decodes a value from the encoded video bitstream and reconstructs the level-1 map 707. The values decoded by the process 900 are zero and one (1) values.

To reconstruct a level-2 map, the process 900 uses the same procedure as that used to generate the level-1 map except that, instead of traversing the reconstructed non-zero map, the process 900 uses the reconstructed level-1 map. The process 900 repeats all the steps until the maximum map level number of level maps are reconstructed.

In an implementation, the maximum map level T can be provided to the process 900 via a configuration. In another implementation, the maximum map level T can be signaled, by an encoder, in the encoded video bitstream. As such, the process 900 decodes the maximum map level T from the encoded video bitstream.

At 908, the process 900 codes a coefficient residual map. Each residual coefficient of the coefficient residual map corresponds to a respective transform coefficient of the transform block having an absolute value that exceeds the maximum map level. When implemented by a decoder, the process 900 reconstructs, e.g., the coefficient residual map 734 of FIG. 7. For each one (1) value of the level-T map, the process 900 decodes a corresponding residual value from the encoded bitstream to reconstruct the coefficient residual map 734 of FIG. 7.

In some implementations, the process 900 can include coding a sign map, at 910. The sign map can be a sign map such as described with respect to the sign map 732 of FIG. 7. The sign map indicates which transform coefficients of the transform block have positive values and which transform coefficients have negative values.

For a transform block of size N×N, in the worst case N×N−1 bins (binary symbols) may need to be context coded to determine the EOB position. For example, when N=32, in the worst cost, a total of 1023 bins may be context coded (i.e., coded using a context model) to determine the EOB position.

Some implementations can use scan positions groups to reduce the number of context-coded bins required to code the EOB position. As such, coding the scan position corresponding to the end-of-block position can include coding an index of a scan positions group that includes the scan position and coding an offset within the scan positions group, the offset corresponding to a position of the scan position within the scan positions group.

In an implementation of level maps, the value EOB=0 can be reserved for indicate that all transform coefficients of the block are zero. That is, when EOB=0, then the block is an all-zero block.

In an example of such implementations, the scan positions can be partitioned (e.g., grouped) into 11 scan positions groups: 1, 2, [3, 4], [5-8], [9-16], [17-32], [33-64], [65-128], [129-256], [257-512], [513-1024]. That is, the group with index 0 includes only the scan position 1; the group with index 1 includes only the scan position 2; the group with index 4 includes the scan positions 9-16; and so on. For example, assuming that the scan position 50, corresponding to the EOB, is to be coded, then the index 6 of a scan positions group [33-64] that includes the scan position 50 is coded and the offset 17 (i.e., 50−33=17) within the scan positions group [33-64] is coded.

In an implementation, the index of the group that includes the coded scan position corresponding to the end-of-block is context-coded (i.e., is coded using arithmetic coding using a context model) and the offset within the scan positions group can be coded in by-pass mode. By-pass mode, which may also be referred to as the literal mode, means that the value to be coded is not coded using a context model. The by-pass mode can be used, for example, when the offset values within a range are equally probable. To code the offset 17, five (5) bits are required. As such, in this example, the number of context coded bins for EOB is at most 10 corresponding to the group indexes {0, 1, . . . , 10}.

In an implementation, the index of the group that includes the coded scan position corresponding to the end-of-block is context-coded (i.e., coded using a context model) and at least some of the most significant bits of the offset within the scan positions group can also be context-coded. That is, the offset value can be considered to include prefix bits (i.e. most significant bits) and suffix bits (i.e., least significant bits). The prefix bits can be context-coded and the suffix bits can be coded using by-pass mode. Any number of bits of the offset value can be considered the most significant bits. For example, the offset value 17 corresponds to the binary string 10001. If the first 2 bits are considered most significant, then the bits 10 are context-coded and the bits 001 are by-pass coded (i.e., coded using by-pass mode). If the first 3 bits are considered most significant, then the bits 100 are context-coded and the bits 01 are by-pass coded.

The scan positions can be grouped into scan position groups in any number of ways. In an implementation, and as illustrated by the above group, each group can include a power of 2 number of scan positions. The power of 2 can be the index scan position groups minus 1 (i.e., index−1). For example, the scan position groups at index 5 (i.e., the group [17-32]) includes $2^{5-1}$ (=$2^4$=16) scan positions. As such, to code an offset within a scan position groups having an index inx, only (inx−1) bits are required. For example, one (1) bit is required to code an offset in the group having index 2 (the group [3,4]), two (2) bits are required to code an offset in the group having index 3 (the group [9-16]), and so on.

In an implementation, the number of scan positions in each scan positions group can be limited to a maximum predetermined number (i.e., a ceiling). For example, the group size can be limited to no greater than 16. As such, the above group can be modified as follows: 1, 2, [3, 4], [5-8], [9-16], [17-32], [33-48], [49-64], . . . , [1009-1024]. As such, coding an offset requires no more than 4 bits. To code an EOB position of 50 using the modified groups, the index 7, which corresponds to the scan positions group [49-64], can be coded using arithmetic coding with context models. The offset 1 (=50-49) can be coded in bypass mode by using 4 bits, namely 0001.

In some implementations, the value EOB=0 is not reserved for indicating that all transform coefficients of the block are zero. In such implementations, the scan positions groups can start at 0 and end at 1023, such as 0, 1, [2, 3], [4-7], [8-15], [16-31], [32-63], [64-127], [128-255], [256-511], [512-1023].

As described above, the values of the non-zero map 706 include binary values. The binary values indicate whether a transform coefficient at a given location of the transform block is zero or non-zero. As such, the values of the non-zero map can be considered non-zero flags. The binary values enable the use of sophisticated spatial neighboring templates for context modeling. Such spatial neighboring templates can better capture statistical characteristics of transform blocks, especially those with larger transform block sizes. Accordingly, the coding of non-zero flags (and thus, the coding of transform coefficients) can be improved by fully utilizing the information of neighboring non-zero flags when determining a context for selecting a context model.

A template captures the coded history of the non-zero flags (i.e., values of the non-zero map) that are coded before a current non-zero flag. A template can define (e.g., specify, select, set, or define in any manner whatsoever), for a current scan position, the scan positions of the non-zero map values that are to be used for determining the context for coding the current value. Equivalently, a template can be defined in terms of the Cartesian coordinates, within the non-zero map, of the non-zero values to be used for determining the context.

Figure 10A:
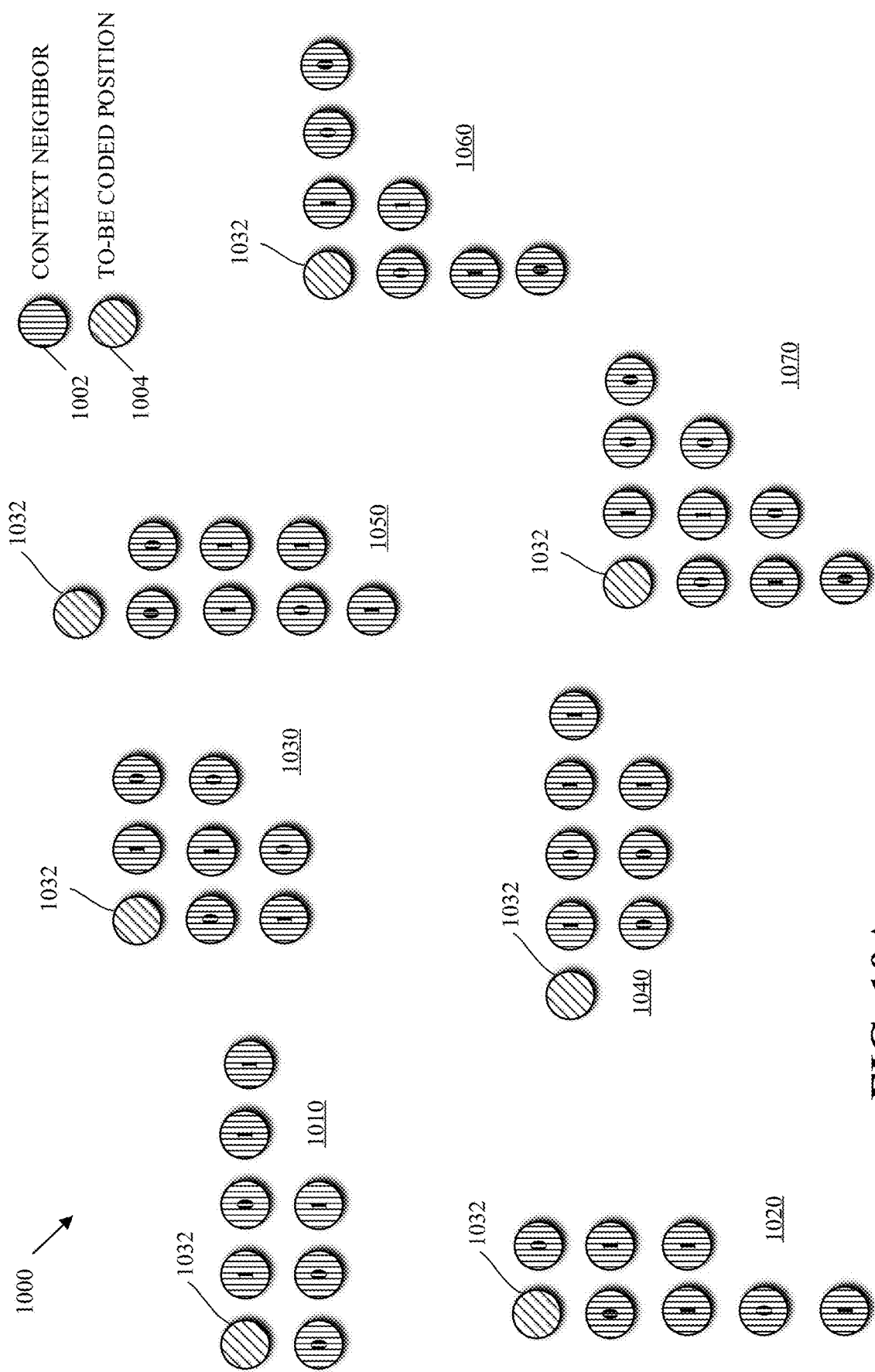
FIGS. 10A-B is a diagram of examples of templates for determining a coding context according to implementations of this disclosure.
Figure 10B:
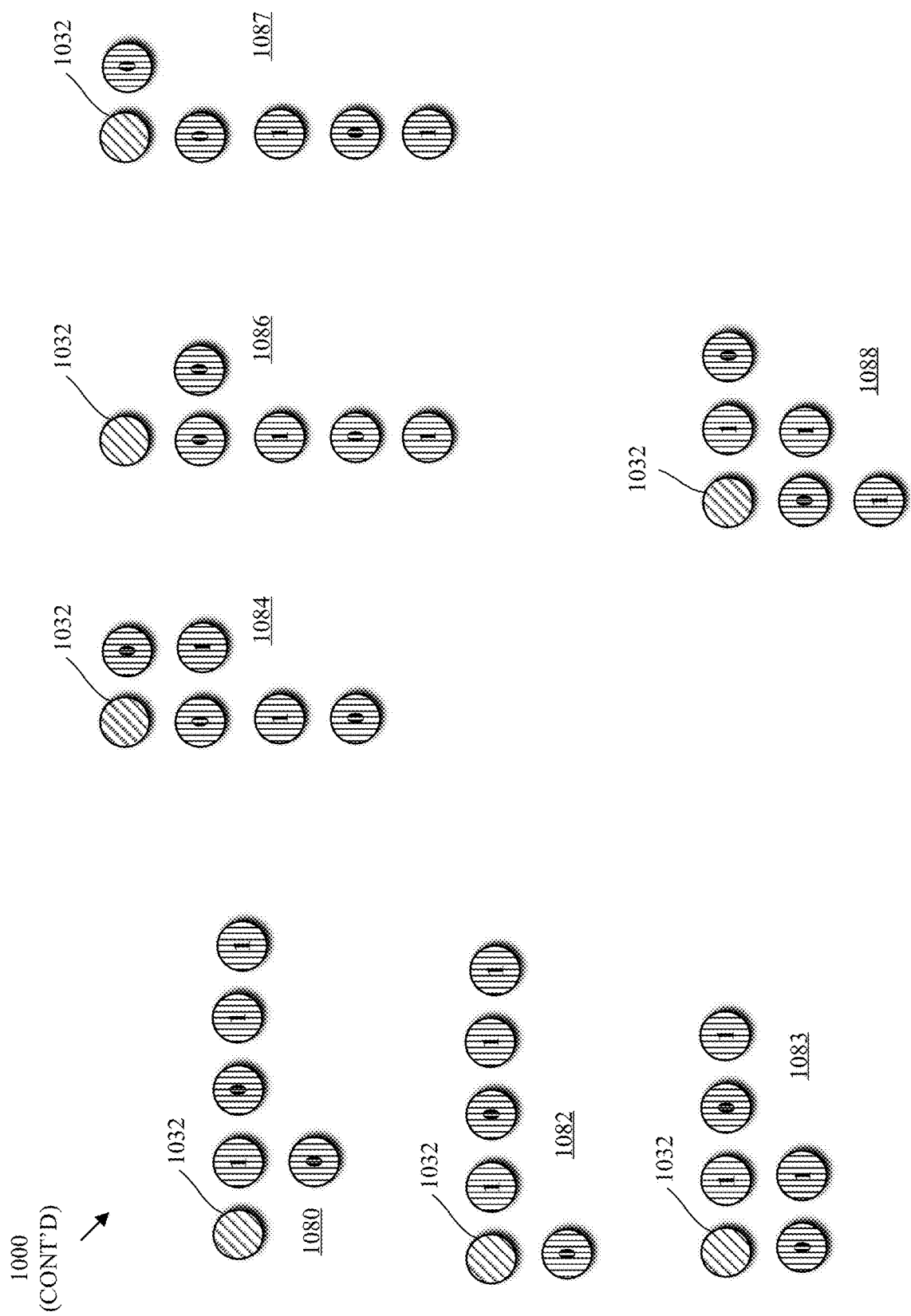

FIGS. 10A-10B is a diagram of examples 1000 of templates for determining a coding context according to implementations of this disclosure. In FIGS. 10A-10B, values (i.e., circles representing values of a non-zero map) shaded using the pattern 1004 are to-be-coded values; and the values shaded with the pattern 1002 are values for which context information are available because these values are coded before a to-be-coded value 1032. In the examples of FIGS. 10A-10B, the to-be-coded value 1032 depicts the current value of the non-zero map to be coded. The examples of FIGS. 10A-10B are non-limiting examples. Templates having other shapes and/or sizes are also possible.

In an example, the number of non-zero values corresponding to the template positions can be used as the context for coding the current value. For example, the values corresponding to the template positions can be added and the sum can be used as the context. In some cases, a context position 1002 may not be available, such as, for example, if the context position is outside the boundaries of the block. In an example, an unavailable value can be assumed to be zero (0). In another example, an unavailable value can be assumed to be one (1).

A codec can use multiple transform types. For example, a transform type can be the transform type used by the transform stage 404 of FIG. 4 to generate the transform block. For example, the transform type (i.e., an inverse transform type) can be the transform type to be used by the dequantization stage 504 of FIG. 5. Available transform types can include a one-dimensional Discrete Cosine Transform (1D DCT) or its approximation, one-dimensional Discrete Sine Transform DST (1D DST) or its approximation, a two-dimensional DCT (2D DCT) or its approximation, two-dimensional DST (2D DST) or its approximation, and an identity transform. Other transform types can be available. In an example, a one-dimensional transform (1D DCT or 1D DST) can be applied in one dimension (e.g., row or column) and the identity transform applied in the other dimension.

In the cases where a 1D transform (e.g., 1D DCT, 1D DST) is used (e.g., 1D DCT is applied to columns (or rows, respectively) of a transform block), the quantized coefficients can be coded by using a row-by-row (i.e., raster) scanning order or a column-by-column scanning order. In the cases where 2D transforms (e.g., 2D DCT) are used, a different scanning order may be used to code the quantized coefficients. As indicated above, different templates can be used to derive contexts for coding the non-zero flags of the non-zero map based on the types of transforms used. As such, in an implementation, the template can be selected based on the transform type used to generate the transform block. As indicated above, examples of a transform type include: 1D DCT applied to rows (or columns) and an identity transform applied to columns (or rows); 1D DST applied to rows (or columns) and an identity transform applied to columns (or rows); 1D DCT applied to rows (or columns) and 1D DST applied to columns (or rows); a 2D DCT; and a 2D DST. Other combinations of transforms can comprise a transform type.

As indicated above with respect to FIG. 9, the non-zero map can be coded in the backward scan direction starting at the last non-zero coefficient (i.e., starting at the highest AC transform coefficient) of the transform block. As such, the coded history of a current value (i.e., a current non-zero flag) of the non-zero map includes values that are to the right and below the current value in the two-dimensional non-zero map, such as the non-zero map 706.

When a 1D vertical transform type is applied, the to-be-coded value 1032 is more correlated with vertical neighbor values than with horizontal neighbor values. As such, a template 1010 can be used in the case a 1D transform (e.g., 1D DCT) is applied to columns. Assuming that the to-be-coded value 1032 is at position (x, y) of the non-zero map, then the template 1010 comprises the values at the seven positions (x+1, y), (x+2, y), (x+3, y), (x+4, y), (x, y+1), (x+1, y+1), and (x+1, y+2).

When a 1D horizontal transform type is applied, the to-be-coded value 1032 is more correlated with horizontal neighbor values than with vertical neighbor values. As such, a template 1020 can be used in the case a 1D transform (e.g., 1D DCT) is applied to rows. Assuming that the to-be-coded value 1032 is at position (x, y) of the non-zero map, then the template 1020 comprises the values at the seven positions (x+1, y), (x, y+1), (x+1, y+1), (x, y+2), (x+1, y+2), (x, y+3), and (x, y+4).

When a 2D transform type (e.g., 2D DCT, 2D DST) is applied, a template 1030 can be used. Assuming that the to-be-coded value 1032 is at position (x, y) of the non-zero map, then the template 1030 comprises the values at the seven positions (x+1, y), (x+2, y), (x, y+1), (x+1, y+1), (x+2, y+1), (x, y+2), and (x+1, y+2).

In some examples of templates, the non-zero value that is scanned immediately before the to-be-coded value 1032 is not included in the template. That is, if the to-be-coded value 1032 is at scan position i, then the non-zero value at scan position (i−1) is not included in the template. Even though the non-zero map is coded in a backward scan direction, the scan order of the scan direction can depend on the transform type. The scan order of the backward scan direction is the order in which non-zero values of the non-zero map are visited from the highest AC value to the DC value. In an example, a vertical scan order can be used when a 1D horizontal transform type is used. As such, the scan direction proceeds in column-wise order (e.g., from bottom to top). In an example, a horizontal scan order can be used when a 1D vertical transform type is used. As such, the scan direction proceeds in row-wise order (e.g., from right to left).

Template 1040 is another example of a template that can be used when a 1D-transform type is applied to columns. In the template 1040, the non-zero value that is scanned immediately before the to-be-coded value 1032 is not included in the template. Assuming that the to-be-coded value 1032 is at position (x, y) of the non-zero map, then the template 1040 comprises the values at the seven positions (x+1, y), (x+2, y), (x+3, y), (x+4, y), (x+1, y+1), (x+1, y+1), and (x+1, y+2).

Template 1050 is another example of a template that can be used when a 1D-transform type is applied to rows. In the template 1050, the non-zero value that is scanned immediately before the to-be-coded value 1032 is not included in the template. Assuming that the to-be-coded value 1032 is at position (x, y) of the non-zero map, then the template 1040 comprises the values at the seven positions (x, y+1), (x+1, y+1), (x, y+2), (x+1, y+2), (x, y+3), (x+1, y+3), and (x, y+4).

Template 1060 is an example of a template that can be used when a 2D transform (e.g., 2D DCT, 2D DST) is used. Assuming that the to-be-coded value 1032 is at position (x, y) of the non-zero map, then the template 1040 comprises the values at the seven positions (x+1, y), (x+2, y), (x+3, y), (x, y+1), (x+1, y+1), (x, y+2), and (x, y+3).

Each of templates 1010-1060 includes seven (7) positions. However, a template can include more or less positions and/or can have other shapes. For example, template 1070 is another example of a template that can be used when a 2D transform type is used. The template 1070 includes eight (8) positions. Assuming that the to-be-coded value 1032 is at position (x, y) of the non-zero map, then the template 1040 comprises the values at the eight positions (x+1, y), (x+2, y), (x+3, y), (x, y+1), (x+1, y+1), (x, y+2), (x+1, y+2), and (x, y+3).

In other examples, a template can include five (5) positions. For example, a template 1088 of FIG. 10B, which includes the positions (x+1, y), (x, y+1), (x+2, y), (x, y+2), (x+1, y+1), can be used for 2D-transform types. For example, templates 1080, 1082, 1083 can be used for a vertical 1D-transform type. The template 1080 includes the positions (x+1, y), (x+2, y), (x+3, y), (x+4, y), and (x, y+1). The template 1082 includes the positions (x+1, y), (x+2, y), (x+3, y), (x+4, y), and (x+1, y+1). The template 1083 includes the positions (x, y+1), (x, y+2), (x, y+3), (x+1, y), (x+1, y+1). For example, templates 1084, 1086, and 1087 can be used for a horizontal 1D-transform type. The template 1084 includes the positions (x+1, y), (x+2, y), (x+3, y), (x, y+1), (x+1, y+1). The template 1086 includes the positions (x, y+1), (x, y+2), (x, y+3), (x, y+4), and (x+1, y+1). The template 1087 includes the positions (x, y+1), (x, y+2), (x, y+3), (x, y+4), and (x+1, y). In some implementation, the positions (x+1, y) and (x, y+1) can be replaced by the positions (x+1, y+2) and (x+2, y+1), respectively.

In some implementations, coding of a level-k map, where k>0, can also use different templates (e.g., templates as described above) depending upon transform types. For example, as described above, one template may be used for 2D-transform type, one template may be used for vertical 1D-transform type, and another template may be used for horizontal 1D-transform type.

In some implementations, the contexts used to code the non-zero flags can depend upon the locations (i.e., the scan positions or the block positions) of the non-zero flags. As such, in some implementations, the transform-type-dependent templates, described above, can be combined with the locations of the non-zero flags to determine a context. To avoid using too many contexts, which may lead to the so-called context dilution problem, the locations can be classified into regions. For example, the classification may be dependent upon the transform type.

Figure 16:
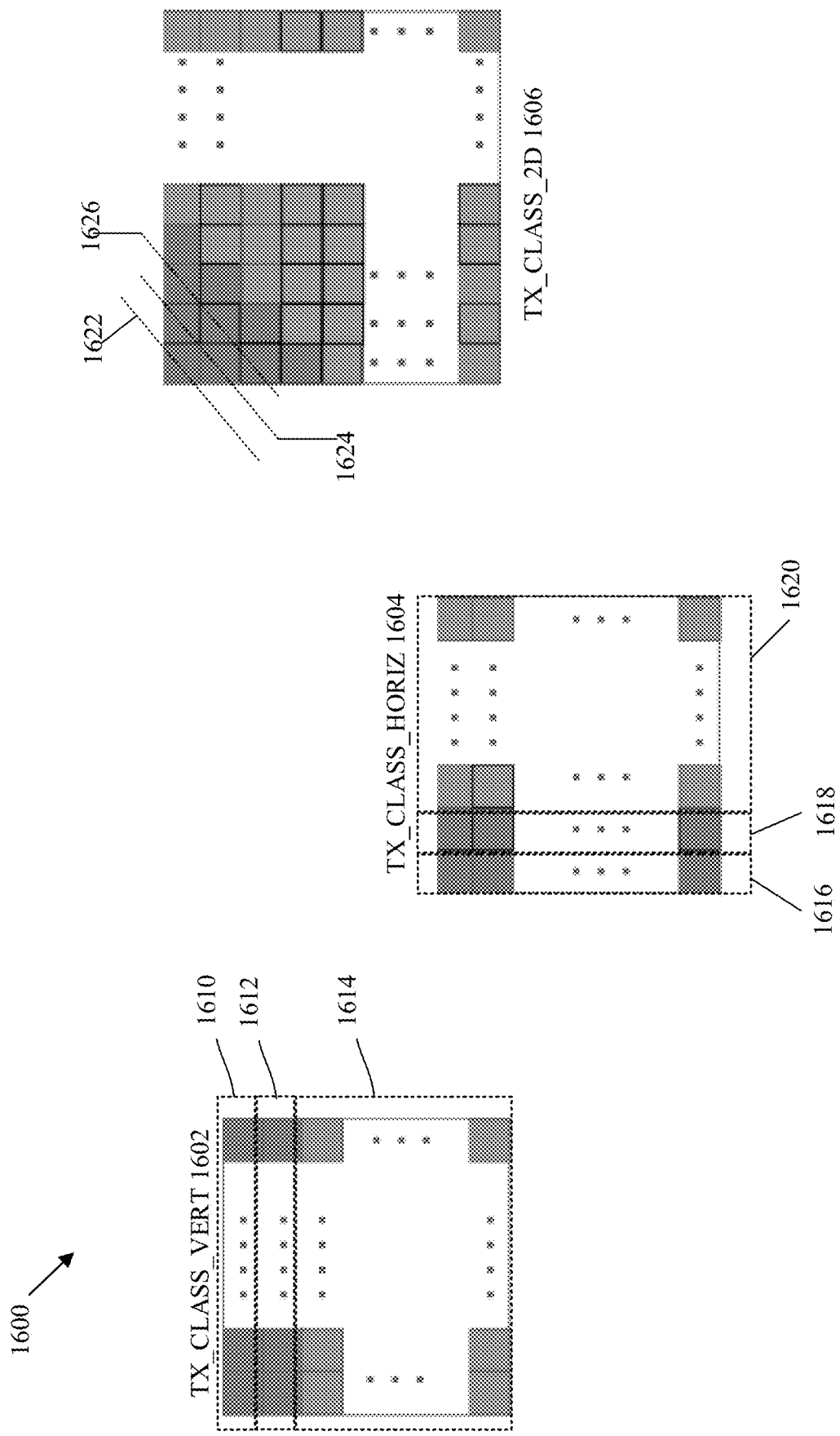
FIG. 16 is a diagram of examples of regions for determining a context according to implementations of this disclosure.

FIG. 16 is a diagram of examples 1600 of regions for determining a context according to implementations of this disclosure. FIG. 16 includes a vertical transform block 1602 (i.e., a transform block of class TX_CLASS_VERT), a horizontal transform block 1604 (i.e., a transform block of class TX_CLASS_HORIZ), and a 2D transform block 1606 (i.e., a transform block of class TX_CLASS_2D). A transform class corresponds to a transform type and a direction. The class TX_CLASS_VERT is referred to as a vertical transform class. The class TX_CLASS_HORIZ is referred to as a horizontal transform class. The class TX_CLASS_2D is referred to as a two-dimensional transform class.

The vertical transform block 1602 is a transform block generated using a 1D vertical transform type as described above. As such, the TX_CLASS_VERT class includes the 1D transform types (e.g. DCT, DST, ADST, or their approximations) applied to columns (i.e., in the vertical direction). The horizontal transform block 1604 is a transform block generated using a 1D horizontal transform type as described above. As such, the TX_CLASS_HORIZ class includes the 1D transform types (e.g. DCT, DST, ADST, or their approximations) applied to rows (i.e., in the horizontal direction). The 2D transform block 1606 is a transform block generated using a 2D transform type as described above. As such, the TX_CLASS_2D class includes any remaining transform types applied to both rows and columns.

A transform block of class TX_CLASS_VERT can be partitioned into $R_V$ (>0) number of regions such that each region includes one or more rows. A transform block of class TX_CLASS_HORIZ can be partitioned into $R_H$ (>0) number of regions such that each region includes one or more columns. A transform block of class TX_CLASS_2D can be partitioned into $R_{2D}$ (>0) number of regions where each region includes one or more anti-diagonal lines.

A transform block can be partitioned into regions in any number of ways. In an example, $R_V$=3, $R_H$=3, and $R_{2D}$=4 and the region classification is as follows:

For a transform block of class TX_CLASS_HORIZ, the first region (i.e., region 1616) consists of the left most column (col=0), the second region (i.e., region 1618) consists of the second leftmost column (col=1), and the third region (i.e., region 1620) consists of the remaining columns.

For a transform block of class TX_CLASS_VERT, the first region (i.e., region 1610) consists of the top most row (row=0), the second region (i.e., region 1612) consists of the second top-most row (row=1), and the third region (i.e., region 1614) consists of the remaining rows.

For a transform block of class TX_CLASS_2D, the first region (i.e., region 1622) consists of the first anti-diagonal line (row+col=0), the second region (i.e., region 1624) consists of the second anti-diagonal line (row+col=1), the third region (i.e., region 1626) consists of the third and the fourth anti-diagonal lines (row+col=2 or 3), and the fourth region (not shown) consists of the remaining anti-diagonal lines.

A region and a transform class (e.g. TX_CLASS_VERT, TX_CLASS_HORIZ, TX_CLASS_2D) combination can correspond to a set of contexts. In an implementation where a context may be retrieved using an offset (corresponding to the context) into an available list (e.g., table) of contexts, each set can be distinguished (e.g., identified) by the set's offset. In some implementations, some of the transform classes can map to the same offset. Mapping transform classes to the same offset means that the transform classes that are mapped to the same offset share contexts.

To derive a context for coding a transform coefficient at location (x, y) of the transform block, where each of the transform classes maps to a distinct offset (i.e., the transform classes do not share offsets), the context (i.e., ctx) can be derived as follows:

If the transform class=TX_CLASS_2D then
ctx=0 if x=0 and y=0
((counts+1)>>1)+1 if x+y<2
((counts+1)>>1)+6 if x+y<4
((counts+1)>>1)+11 otherwise
If the transform class=TX_CLASS_VERT then
ctx=((counts+1)>>1)+16 if y=0
((counts+1)>>1)+16+5 if y<2
((counts+1)>>1)+16+10 otherwise
If the transform class=TX_CLASS_HORIZ then
ctx=((counts+1)>>1)+31 if x=0
((counts+1)>>1)+31+5 if x<2
((counts+1)>>1)+31+10 otherwise In the above example, the offset for TX_CLASS_2D is zero (0), the offset for TX_CLASS_VERT is 16, and the offset for TX_CLASS_HORIZ is 31. In the example, for a transform block of class TX_CLASS_2D, the first region (i.e., the DC coefficient only) has one context and each remaining region has five (5) contexts. For a transform block of class TX_CLASS_VERT or TX_CLASS_HORIZ, each region has five (5) contexts. Further in the example above, counts (e.g., sums) are computed by using a template of size 7 and that depends on the transform type class as described above with respect to FIG. 10A. As such, (counts+1)>>1 is a number between 0 and 4 (">>1" right-shifts (counts+1) by 1 bit).

In the FIGS. 6-10, the coding of transform blocks (e.g., the transform coefficients of the transform blocks) using level maps is described. However, other codecs can code the transform coefficients using a coefficient token tree and/or using an alphabet of coefficient tokens that may be organized into a coefficient token tree.

In an example, to derive a context for coding a transform coefficient at location (x, y) of the transform block, where the TX_CLASS_VERT and TX_CLASS_HORIZ map to the same offset, the context (i.e., ctx) can be derived as follows:

If the transform class=TX_CLASS_2D then
ctx=0 if x=0 and y=0
((counts+1)>>1)+1 if x+y<2
((counts+1)>>1)+6 if x+y<4
((counts+1)>>1)+11 otherwise
If the transform class is one of (TX_CLASS_VERT OR TX_CLASS_HORIZ) then
ctx=((counts+1)>>1)+16 if y=0
((counts+1)>>1)+16+5 if y<2
((counts+1)>>1)+16+10 otherwise Mapping some of the transform classes to a same offset can reduce the number of contexts. In at least some situations (e.g., depending on the characteristics of a video sequence being coded), mapping transform classes (e.g., the transform classes TX_CLASS_VERT and the TX_CLASS_HORIZ) to a same offset can also result in an improved coding performance. In general, intermingling (e.g., mixing) statistics may negatively impact compression performance when the statistics are different. However, since contexts given by the classes TX_CLASS_VERT and TX_CLASS_HORIZ can be similar in statistics, combining the contexts of these transform classes can show positive impact on compression performance by reducing the effect of the so-called context-dilution problem.

As described above with respect to FIG. 7, the level maps are coded sequentially. That is, the non-zero map 706 is coded, then the level-1 map is coded, then the level-2 map is coded, and then the coefficient residual map 734 is coded. However, in some implementations, a different coding structure can be used.

As described above with respect to FIGS. 10A-10B, coding of a level-k map, where k>0, can also use different templates (e.g., templates as described above) depending upon transform types. That is, a template, as described above can be used to determine a context for coding whether a coefficient at (x, y) is greater than 1 (e.g., using a corresponding value of a level-1 map, such as the level-1 map 707 of FIG. 7) or is greater than 2 (e.g., using a corresponding value of a level-2 map, such as the level-2 map 709 of FIG. 7).

As such, each coefficient can be coded up to whether the coefficient is greater than the maximum map level. In the example of FIG. 7, the maximum map level is 2. As such, each coefficient can be coded up to whether the coefficient is greater than 2 (using corresponding values of level maps) before proceeding to coding of a next coefficient. In an implementation, a coefficient value that is greater than 2 (i.e., a coefficient value that is greater than the maximum map level) can be represented by the value 3 (i.e., the maximum map level+1). As such, coding a coefficient "up to whether the coefficient is greater than maximum map level (e.g., 2)" can mean coding a value 0, 1, 2, . . . , (maximum map level+1) (e.g. 3) corresponding, respectively and in the case what the maximum map level is 2, to a coefficient having a value equal to 0, equal to 1, equal to 2, and greater than 2.

Figure 17:
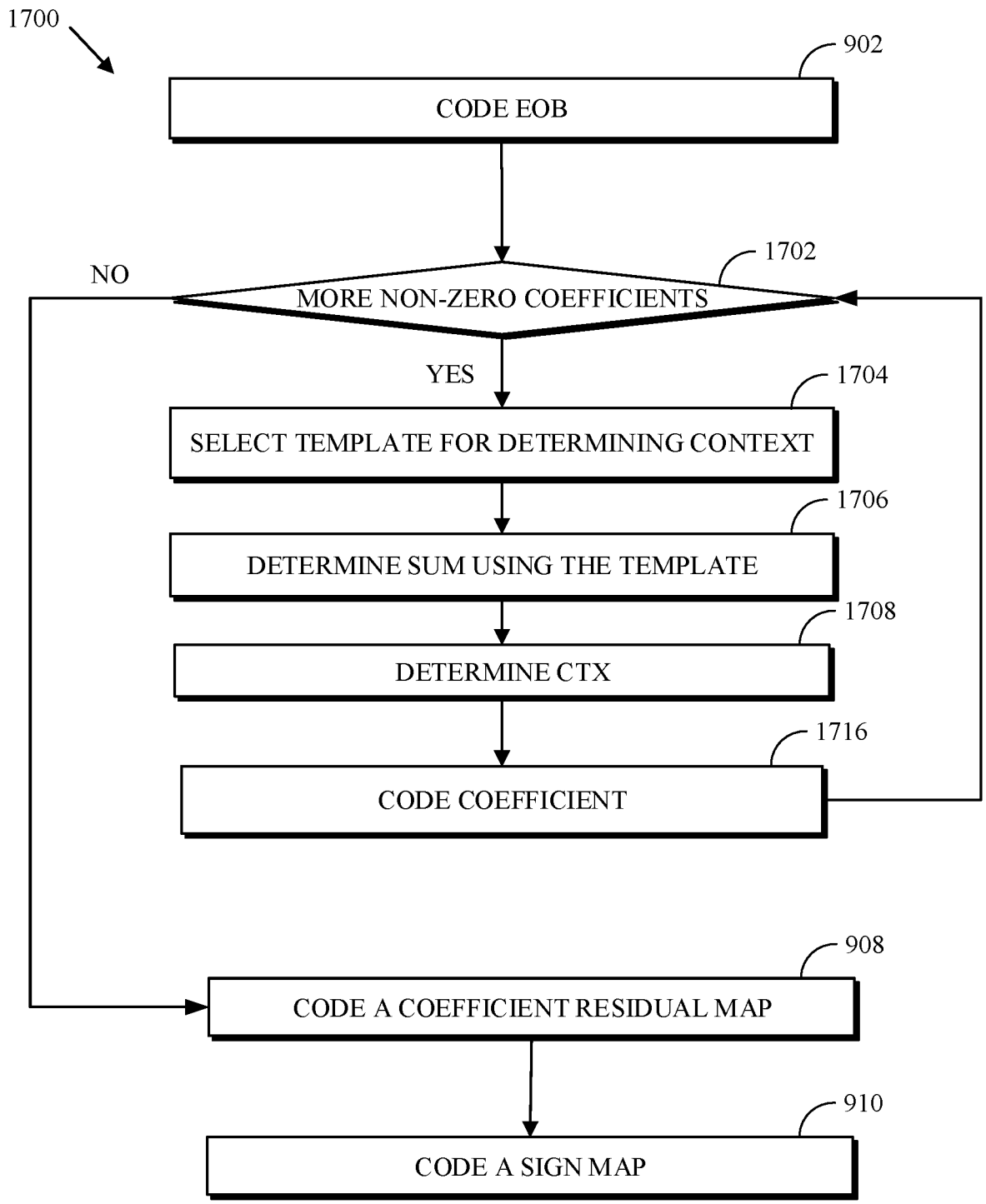
FIG. 17 is a flowchart diagram of a process for decoding a transform block using level maps according to an implementation of this disclosure.

FIG. 17 is a flowchart diagram of a process 1700 for decoding a transform block using level maps according to an implementation of this disclosure. Unlike the process 900 which codes the level maps sequentially (i.e., each map is coded before proceeding to coding the next map), the process 1700 codes, for each non-zero coefficient, using a template, and in a case where the maximum map level is 2 (i.e., T=2), whether the coefficient is 0, 1, 2, or greater than 2 (represented by the value 3). That is, the process 1700 codes a coefficient before proceeding to the next coefficient in the scan order. The process 1700 can include blocks similar to those of the process 900. Descriptions of the similar blocks (e.g., 902, 908, and 910) are omitted. Some implementations of the process 1700 can include the block 910 before the block 908.

The process 1700 can be implemented by an encoder such as the encoder 400 of FIG. 4. When implemented by an encoder, coding means encoding in an encoded bitstream, such as the compressed bitstream 420 of FIG. 4. For example, the process 1700 can be performed in whole or in part by the entropy encoding stage 408 of the encoder 400. The process 1700 can be performed by a decoder such as the decoder 500 of FIG. 5. When implemented by a decoder, coding means decoding from an encoded bitstream, such as the compressed bitstream 420 of FIG. 5. For example, the process 1700 can be performed in whole or in part by the entropy decoding stage 502 of the decoder 500 and the encoded video bitstream can be the compressed bitstream 420 of FIG. 5.

Implementations of the process 1700 can be performed by storing instructions in a memory such as the memory 204 of the receiving station 106 to be executed by a processor such as CPU 202, for example.

The process 1700 can be implemented using specialized hardware or firmware. Some computing devices can have multiple memories, multiple processors, or both. The steps or operations of the process 1700 can be distributed using different processors, memories, or both. For simplicity of explanation, the process 1700 is depicted and described as a series of steps or operations. However, the teachings in accordance with this disclosure can occur in various orders and/or concurrently. Additionally, steps in accordance with this disclosure may occur with other steps not presented and described herein. Furthermore, not all illustrated steps or operations may be used to implement a method in accordance with the disclosed subject matter.

At 1702, the process 1700 determines whether there are more non-zero coefficients to code. If so, the process 1700 proceeds to 1704 to code a current quantized transform coefficient at (x, y); otherwise, the process 1700 proceeds to 908. At 1704, the process 1700 selects a template for coding a current quantized transform coefficient. As used in this disclosure, "select" means to identify, construct, determine, specify, generate, or other select in any manner whatsoever. The template can be a template as described with respect to FIGS. 10A-10B. In an example, the same template is used for coding all the coefficients of the transform block. As such, the template can be selected once for the process 1700 and be performed before the block 1702.

At 1706, the process 1700 determines a context using the template. The process 1700 can determine the context using the template in any number of ways. Each template position corresponds to a value (e.g., 0, 1, . . . , T+1). Combinations of the values can be used to determine the context. For example, a sum of the values can be used. For example, a weighted sum can be used to determine the context. The weight assigned to a position can be set based on the distance to the "origin" (i.e., the location (x, y) of the current transform coefficient for which the context is determined). Examples of distance include a scan position distance (e.g., a difference between the scan position of the current coefficient and a position of the template) or a Cartesian distance. However, other ways of setting the weight can be available. In yet another example, a non-linear function can be used. For examples, the maximum or minimum value in the template can be used for determining the context. In yet another example, the context can be determined using a combination of the sum and the maximum values. Other methods and/or values, or combinations of methods and/or values, can be used for determining the context from the template.

Using the sum (i.e., addition) of the values at the positions of the template to determine a context is now given. It should be understood that the following can be used with any method for determining the context using the template.

The process 1700 can add up (sums) the values corresponding to the positions of the template. When using a template for deriving a context for coding a coefficient, each of the positions of the template can have one of the values 0, 1, 2, or 3 (i.e., when T=2). As such, if the template includes N positions, then the maximum sum can be 3*N. For example, if a template that includes 5 positions is selected at 1704, then the maximum sum can be 15 (=3*5); if a template that includes 7 positions is selected, then the maximum sum can be 21 (=3*7).

In an implementation, where level maps as described with respect to FIG. 7 are used, to determine a value for a position of the template, the values, at the same positions in the non-zero maps and the level-k maps can be added or counted. For example, assuming that the position of the last non-zero transform coefficient 708 is a position of the template, then the value of the template at that position can be determined to be the sum of the values at 712 (i.e., 1) and 716 (i.e., 0) of the non-zero map 706 and level-1 map 707. As such, the value is 1. As another, assuming that the position of the transform coefficient 739 is a position of the template, then the value of the template at that position can be determined to be the sum of the values at the corresponding locations of in the non-zero map 706, the level-1 map 707, and the level-2 map 709. As such, the value is 3. As such, the context index can be determined using a sum of the values corresponding to positions of the template where each value of the template is determined by summing respective values of at least some of the level maps.

In another implementation, the level maps, including the zero map and as described with respect to FIG. 7 are not generated. Instead, a single map level can be used to indicate, whether a transform coefficient is one of 0, 1, . . . , T+1. As such, given a scan position i, level[i]={0, 1, . . . , T+1}. The single map can include values for all transform coefficients of the transform block. Alternatively, the single map can include values for coefficients up to the end-of-block coefficient. That is, the single map level can include values for each transform coefficient up to and including the last non-zero coefficient of the transform block.

As such, the sum for determining the context can be generated by adding the respective values of the single map level. For example, assuming that the template includes 5 positions corresponding to the scan positions $l_1$, $l_2$, $l_3$, $l_4$, and $l_5$, then the sum can be determined as sum=level[$l_1$]+level[$l_2$]+level[$l_3$]+level[$l_4$]+level[$l_5$].

Using the sum, the process 1700 can determine a context index (i.e., ctx). The context index can be determined using an operation that is similar to the operation ((counts+1)>>1) as described above. However, instead of using "count," a "sum" is used. As such, the process 1700 uses ((sum+1)>>1) for determining the context index.

The context index ctx may be out of range. For example, assuming that the sum is 15, the transform class is TX_CLASS_2D, and that (x, y) is (1, 2), then the context index is ((sum+1)>>1)+6=((15+1)>>1)+6=14. However, the number of available contexts for the TX_CLASS_2D, using the above example, is 11. As such, the context index is out of range. Equivalently, a sum that results in a context index that is out of range can itself be considered out of range. If the context index is out of the range, then, the process 1700 can set the context index to a predetermined number. As such, the process 1700 can determine the context index using a formula such as min(((sum+1)>>1), predetermined number). As such, the value ((sum+1)>>1) is upper-bounded by the predetermined number. In an example, the predetermined number can be 4. In an example, the predetermined number can depend on the transform class type. The predetermined number can be selected in any other ways.

The context index ctx can be used to select a context for coding the current transform coefficient. At 1708, the process 1700 codes the coefficient using the context.

An implementation of the process 1700 that uses the single map level for coding transform coefficients of the transform block can be summarized using the following procedure:

```
1.   for (i=eob-1; i>=0; i--) {
2.       if (i < eob-1) code level[i]>0;
3.       if (level[i] > 0) {
4.           for (j=0; j<T; j++) {
5.               code level[i] > j+1
6.               if (level[i] == j+1)
7.                   break;
8.           }
9.       }
10.  }
11.  for (i==0; i < eob; i++) {
12.      if level[i] != 0
13.          code sign[i]
14.  }
15.  for (i=eob-1; i >= 0; i--)
16.      if level[i] > T
17.          code level[i]-T-1
```

The steps 1-10 are repeated for each transform coefficient up to the last non-zero coefficient of the transform block. For a transform coefficient at scan position i, the steps 2-9 code up to whether a transform coefficient of the transform block is greater than a maximum map level of the level maps. For example, assuming that the maximum map level T=2 and i<eob-1, if level[i]=3, then the steps 2-9 code the bits 111; if level[i]=0, then the steps 2-9 code the bit 0; and if level[i]=2, then the steps 2-9 code the bits 110. The steps 11-14 code the sign bits (e.g., the values of the sign map 732 of FIG. 7) of the non-zero transform coefficients up to the last non-zero coefficient. The steps 15-17 code, for each non-zero coefficient that is greater than the maximum level map T (i.e., level[i]>T), a residual for the transform coefficient. The values of the residuals can be as described with respect to the coefficient residual map 734.

Using the coding structure described in FIG. 17 for coding a transform coefficient (i.e., a quantized transform coefficient), as compared to the coding structure described with respect to FIG. 9, better throughput can be obtained. Better throughput can mean that a transform block can be decoded faster using the coding structure of the process 1700 than that of the process 900.

Figure 11:
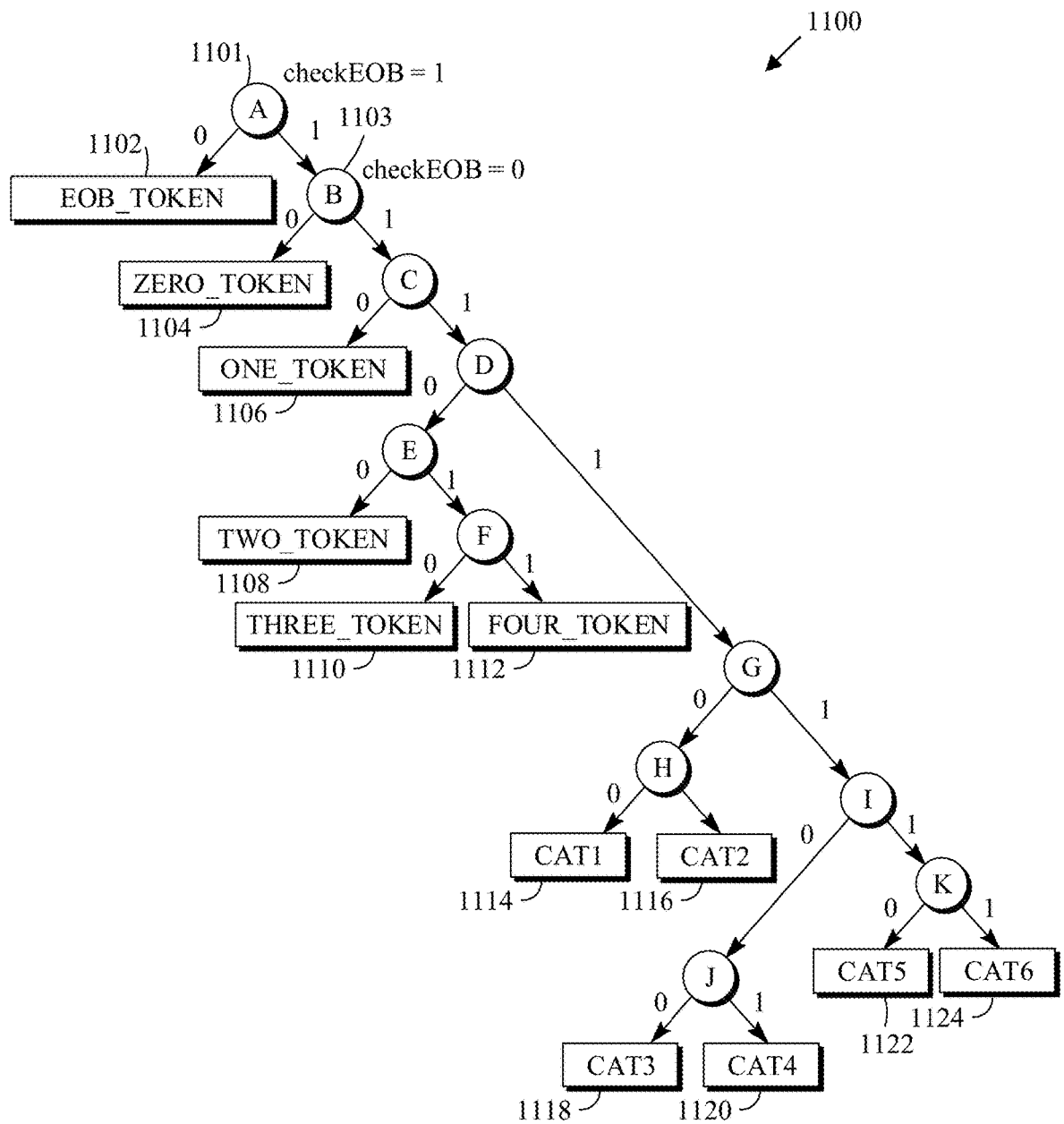
FIG. 11 is a diagram of a coefficient token tree that can be used to entropy code transform blocks according to implementations of this disclosure.

FIG. 11 is a diagram of a coefficient token tree 1100 that can be used to entropy code transform blocks according to implementations of this disclosure. The coefficient token tree 1100 is referred to as a binary tree because, at each node of the tree, one of two branches must be taken (i.e., traversed). The coefficient token tree 1100 (which may also be referred to as a binary token tree) specifies the scope (e.g., magnitude) of the value of a transform coefficient to be coded, with forward-adaptive probabilities for each branch in this token tree. The token base value is subtracted from the value to be coded to form a residual then the block is coded with fixed probabilities. A similar scheme with minor variations including backward-adaptivity is also possible.

Using the coefficient token tree 1100, a string of binary digits is generated for a quantized coefficient of the quantized transform block (such as the transform block 704 of FIG. 7). Each of the binary digits is coded. Herein, "coding a bit" can mean the outputting or generating of a bit in the codeword representing a transform coefficient being encoded. Similarly, "decoding a bit" can mean the reading (such as from an encoded bitstream) of a bit of the codeword corresponding to a quantized transform coefficient being decoded such that the bit corresponds to a branch being traversed in the coefficient token tree. The bits are entropy coded using a context.

In an example, the quantized coefficients in an N×N block (e.g., the transform block 704) are organized into a 1D (one-dimensional) array (herein, an array u) following a prescribed scan direction (e.g., the scan order 702 of FIG. 7). N can be 4, 8, 16, 32, or any other value. The quantized coefficient at the ith position of the 1D array can be referred as u[i], where i=0, . . . , N*N−1.

In an implementation, the end-of-block (EOB) can indicate the position of the last non-zero coefficient. However, in other implementations, and in the subsequent description of FIG. 11, unless otherwise specified, the EOB denotes the starting position of the last run of zeroes in u[i], . . . , u[N*N−1].

In the case where when u[N*N−1] is not zero, the EOB can be set to the value N*N. That is, if the last coefficient of the 1D array u is not zero, then EOB can be set to the value N*N. The values at each of the u[i]s are quantized transform coefficients. The quantized transform coefficients of the 1D array u may also be referred herein simply as "coefficients" or "transform coefficients." The coefficient at position i=0 corresponds to the DC coefficient. In this example, the eob is equal to 12 because there are no non-zero coefficients after the zero coefficient at position 12 of the 1D array u.

To encode and decode the coefficients u[i], u[N*N−1], for i=0 to N*N−1, a token t[i] is generated at each position i<=eob. The token t[i], for i<eob, can be indicative of the size and/or size range of the corresponding quantized transform coefficient at u[i]. The token for the quantized transform coefficient at EOB can be an EOB_TOKEN, which is a token that indicates that the 1D array u contains no non-zero coefficients following the eob position (inclusive). That is, t[eob]=EOB_TOKEN indicates the EOB position of the current block. Table I provides a listing of an example of token values, excluding the EOB_TOKEN, and their corresponding names according to an implementation of this disclosure.

TABLE I

| Token | Name of Token |
|---|---|
| 0 | ZERO_TOKEN |
| 1 | ONE_TOKEN |
| 2 | TWO_TOKEN |
| 3 | THREE_TOKEN |
| 4 | FOUR_TOKEN |
| 5 | DCT_VAL_CAT1 (5, 6) |
| 6 | DCT_VAL_CAT2 (7-10) |
| 7 | DCT_VAL_CAT3 (11-18) |
| 8 | DCT_VAL_CAT4 (19-34) |
| 9 | DCT_VAL_CAT5 (35-66) |
| 10 | DCT_VAL_CAT6 (67-2048) |

In an example, quantized coefficient values are taken to be signed 12-bit integers. To represent a quantized coefficient value, the range of 12-bit signed values can be divided into 11 tokens (the tokens 0-10 in Table I) plus the end of block token (EOB_TOKEN). To generate a token to represent a quantized coefficient value, the coefficient token tree 1100 can be traversed. The result (i.e., the bit string) of traversing the tree can then be encoded into a bitstream (such as the bitstream 420 of FIG. 4) by an encoder as described with respect to the entropy encoding stage 408 of FIG. 4.

The coefficient token tree 1100 includes the tokens EOB_TOKEN (token 1102), ZERO_TOKEN (token 1104), ONE_TOKEN (token 1106), TWO_TOKEN (token 1108), THREE_TOKEN (token 1110), FOUR_TOKEN (token 1112), CAT1 (token 1114 that is DCT_VAL_CAT1 in Table I), CAT2 (token 1116 that is DCT_VAL_CAT2 in Table I), CAT3 (token 1118 that is DCT_VAL_CAT3 in Table I), CAT4 (token 1120 that is DCT_VAL_CAT4 in Table I), CAT5 (token 1122 that is DCT_VAL_CAT5 in Table I) and CAT6 (token 1124 that is DCT_VAL_CAT6 in Table I). As can be seen, the coefficient token tree maps a single quantized coefficient value into a single token, such as one of the tokens 1104, 1106, 1108, 1110 and 1112. Other tokens, such as the tokens 1114, 1116, 1118, 1120, 1122 and 1124, represent ranges of quantized coefficient values. For example, a quantized transform coefficient with a value of 37 can be represented by the token DCT_VAL_CAT5—the token 1122 in FIG. 11.

The base value for a token is defined as the smallest number in its range. For example, the base value for the token 1120 is 19. Entropy coding identifies a token for each quantized coefficient and, if the token represents a range, can form a residual by subtracting the base value from the quantized coefficient. For example, a quantized transform coefficient with a value of 20 can be represented by including the token 1120 and a residual value of 1 (i.e., 20 minus 19) in the encoded video bitstream to permit a decoder to reconstruct the original quantized transform coefficient. The end of block token (i.e., the token 1102) signals that no further non-zero quantized coefficients remain in the transformed block data.

In another example of transform coefficient coding, the tokens available for coding transform coefficients can be split into groups of tokens. The available tokens can be organized as described with respect to the coefficient token tree 700. In an example, the tokens are split into two sets of tokens: a set of head tokens and a set of tail tokens. A token of the set of head tokens is referred to herein as a head token. A token of the set of tail tokens is referred to herein as a tail token. The split into groups of tokens may be logical. That is, for example, a token can be considered to be part of a group even though there may not be stored data indicating that the token is in the group.

When coding the DC transform coefficient, the set of head tokens includes the tokens BLOCK_Z_TOKEN, ZERO_TOKEN, ONE_NEOB, ONE_EOB, TWO_PLUS_NEOB, and TWO_PLUS_EOB. That is, when coding the DC coefficient, the set of head tokens can include six (6) tokens. The DC coefficient corresponds to the first scan position in a forward scan direction. The BLOCK_Z_TOKEN indicates that there are no non-zero coefficients in the transform block. The BLOCK_Z_TOKEN can have a value of 255.

When coding a transform coefficient other than the DC transform coefficient, the set of head tokens includes the tokens: ZERO_TOKEN, ONE_NEOB, ONE_EOB, TWO_NEOB, and TWO_EOB. That is, when coding a coefficient other than the DC coefficient, the set of head tokens includes five (5) tokens. A coefficient other the DC coefficient is a coefficient that does not correspond to the first scan position in the forward scan direction.

The token ZERO_TOKEN (which, in an example, can have a value of 0) can indicate that the transform coefficient coded with the ZERO_TOKEN has a value of 0. The token ONE_EOB (which, in an example, can have a value of 1) can indicate that the current transform coefficient has a value of 1 and is followed by the EOB. That is, the current transform coefficient is the last non-zero coefficient of the transform block. The token ONE_NEOB (which, in an example, can have a value of 2) can indicate that the current transform coefficient has a value of one and is not the last non-zero transform coefficient of the transform block.

The token TWO_PLUS_EOB (which, in an example, can have a value of 3) can indicate that the current transform coefficient has a value that is greater than two (2) and is followed by the EOB. That is, the current transform coefficient is the last non-zero coefficient of the transform block. The token TWO_PLUS_NEOB (which, in an example, can have a value of 4) can indicate that the current transform coefficient has a value that is greater than two (2) and is not the last non-zero transform coefficient of the transform block. If either the TWO_PLUS_EOB or the TWO_PLUS_NEOB token is coded, then a token from the tail set of tokens is also coded.

The set of tail tokens includes the tokens: TWO_TOKEN, THREE_TOKEN, FOUR_TOKEN, DCT_VAL_CAT1, DCT_VAL_CAT2, DCT_VAL_CAT3, DCT_VAL_CAT4, DCT_VAL_CAT5 and DCT_VAL_CAT6. The set of tail tokens includes nine (9) tokens. A token from the set of tail tokens is used only if a TWO_EOB or TWO_NEOB in the set of head tokens is coded. As mentioned elsewhere, coded means encoded by an encoder or decoded by a decoder.

A codec can use the same information to derive a context for coding a token, whether the token is a head token or tail token. In an example, the information used to determine the context includes: a transform size, a plane type, a reference type, a band position, and a coefficient context.

The transform size is the smallest square transform size that covers the transform used to generate the transform block being coded. In an example, the transform size can be one of the values {TX_4×4, TX_8×8, TX_16×16, TX_32×32} corresponding respectively to square transform sizes 4×4, 8×8, 16×16, and 32×32. For example, if a transform of size 8×16 is used to generate the transform block, then the transform size for determining the coding context is the value TX_16×16. As another example, if a transform of size 8×4 is used to generate the transform block, then the transform size for determining the coding context is the value TX_8×8.

The plane type indicates whether the current transform block is a luminance block or a chrominance block. As such, the plane type can have the values {PLANE_TYPE_Y, PLANE_TYPE_UV} where PLANE_TYPE_Y corresponds to a transform block of a luminance block and PLANE_TYPE_UV corresponds to transform block of a chrominance block (a U or V chrominance block).

The reference type can have one of the values {0, 1}. The reference type indicates whether the source block, from which the transform block resulted, was intra-predicted or not. If the block was intra-predicted, then the reference type can be zero (0); otherwise reference type is one (1).

Band position can have one of the values {0, 1, 2, 3, 4, 5}. The scan position of a current coefficient is mapped to one of the bands {0, 1, 2, 3, 4, 5}. The band positions constitute a mapping from scan positions to a band position. For example, scan positions 0-4 may be mapped to band position 0, scan positions 5-9 may be mapped to band position 1, scan positions 10-16 may be mapped to band position 2, and so on. As such, if the coefficient at scan position 12 is being encoded, then the band position is 2. Other mappings are possible.

The coefficient context can have one of the values {0, 1, 2, 3, 4, 5}. In an example, the combined sum of the left and above neighbor transform coefficients of the current coefficient can be mapped to one of the values {0, 1, 2, 3, 4, 5}.

As such, the total number of possible contexts is 576 (=4 transform sizes*2 reference types*2 reference types*6 band positions*6 coefficient contexts). Each context provides a probability distribution for coding the coefficient tokens. For example, a probability distribution for coding one of the nine (9) tail tokens includes nine (9) probabilities. However, as the sum of the probabilities in a probability distribution is equal to 1, the context need provide only eight (8) probabilities where the ninth can be derived. As such, given an alphabet of N (e.g., 9) symbols (e.g., tokens), N−1 (e.g., 9−1=8) total number of freedoms in the probabilities are required. That is, for example, N−1 probability values need be stored and retrieved.

For the above described set of head tokens and set of tail tokens, the total number of freedoms is given by: the number of freedoms for the head tokens when not coding the DC coefficient+the number of freedoms for the head tokens when coding the DC coefficient+the number of freedoms for the tail tokens. The total number of freedoms is 7008 (2304+96+4608):

1. The number of freedoms for the head tokens when not coding the DC coefficient is =576*4=2304. Four (4) is the number of tokens in the set of head tokens minus 1 (i.e., 5−1).
2. The number of freedoms for the head tokens when coding the DC coefficient is =4×2×2×1×6=96. The 96 corresponding to 4 transform sizes multiplied by 2 plane types multiplied by 2 reference types multiplied by 1 band position multiplied by 6 coefficient contexts. When coding the DC coefficient, the number of possible band positions is one (1) because the position of the DC coefficient is known/fixed in the transform block.
3. The number of freedoms for the tail tokens is = 576*8=4608. Eight (8) is the number of tokens in the set of tail tokens minus 1 (i.e., 9−1).

If each probability is stored by using N bits, where N is an integer value, then a total of 7008*N bits are needed to store the probabilities needed for coefficient coding. In the case where N is 8, 54K bits of memory are required; in the case where N is 16, 108K bits are required.

Implementations according to this disclosure can reduce the amount of storage required to store probability distributions for coding transform coefficients by using different contexts for the coding head tokens than the contexts for tail tokens.

For example, whereas coding head tokens can use the context information described above, fewer band positions can be used for determining a context for tail tokens. For example, instead of using six (6) band positions as described above, three (3) band positions, {0, 1, 2}, can be used for tail tokens. As mentioned above, whereas a head token can be coded without coding a tail token, a tail token is coded only if a TWO_NEOB or a TWO_EOB head token is coded. As such, if a band position of the corresponding head token is greater than 2, then the band position of the tail token can be taken to be the band value 2. The probability distributions of tail tokens may not be sensitive to band positions that are larger than or equal to two given coefficient contexts.

In another example, whereas coding head tokens can use the context information and values described above, fewer transform types can be used for determining a context for tail tokens as the probability distributions of tail tokens do not seem to be sensitive to large transform types given coefficient contexts and band positions. For example, instead of using four (4) transform types as described above, three (3) transform types, for example {TX_4×4, TX_8×8, TX16×16_Above}, can be used for tail tokens. If the transform type of the corresponding head token is one of TX_16×16, and TX_32×32, then the value TX_16×16_Above can be used for the tail token.

Using three band transform types for tail tokens, the number of contexts used to code tail tokens is 288 (=4*2*2*3*6=4 transform sizes*2 plane types*2 reference types*3 band positions*6 coefficient contexts) resulting in a 50% reduction in contexts for coding tail tokens. Accordingly, the total number of freedoms in coding tail tokens is 288*8=2304.

Using, additionally, three transform types for tail tokens, the number of contexts used to code tail tokens can be further reduced to 216 (=3*2*2*3*6=3 transform sizes*2 plane types*2 reference types*3 band positions*6 coefficient contexts) resulting in an additional 12.5% reduction in contexts for coding tail tokens. Accordingly, the total number of freedoms in coding tail tokens is 216*8=1728.

By reducing the number of freedoms for coding the tail tokens to 1728, the total number of freedoms (i.e., the number of stored probabilities) can be reduced to 4128 (=2304+96+1728) constituting a reduction of 41% (=(7008−4128)/7008) in stored probabilities.

Figure 12:
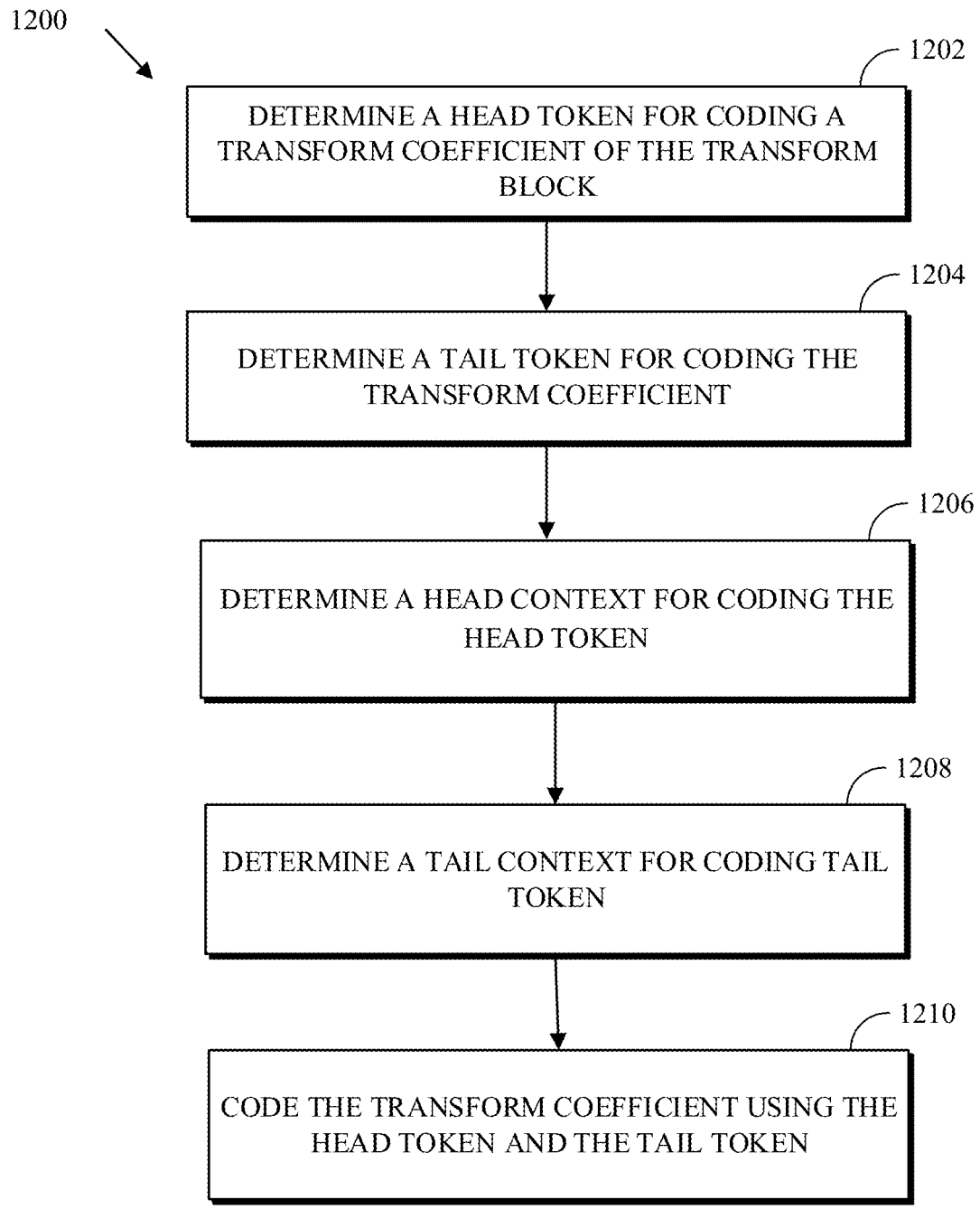
FIG. 12 is a flowchart diagram of a process for coding a transform block using a coefficient alphabet including head tokens and tail tokens according to an implementation of this disclosure.

FIG. 12 is a flowchart diagram of a process 1200 for coding a transform block using a coefficient alphabet including head tokens and tail tokens according to an implementation of this disclosure. The process 1200 can be implemented by an encoder such as the encoder 400 of FIG. 4. When implemented by an encoder, coding means encoding in an encoded bitstream, such as the compressed bitstream 420 of FIG. 4. For example, the process 1200 can be performed in whole or in part by the entropy encoding stage 408 of the encoder 400. The process 1200 can be performed by a decoder such as the decoder 500 of FIG. 5. When implemented by a decoder, coding means decoding from an encoded bitstream, such as the compressed bitstream 420 of FIG. 5. For example, the process 1200 can be performed in whole or in part by the entropy decoding stage 502 of the decoder 500 and the encoded video bitstream can be the compressed bitstream 420 of FIG. 5.

Implementations of the process 1200 can be performed by storing instructions in a memory such as the memory 204 of the receiving station 106 to be executed by a processor such as CPU 202, for example.

The process 1200 can be implemented using specialized hardware or firmware. Some computing devices can have multiple memories, multiple processors, or both. The steps or operations of the process 1200 can be distributed using different processors, memories, or both. For simplicity of explanation, the process 1200 is depicted and described as a series of steps or operations. However, the teachings in accordance with this disclosure can occur in various orders and/or concurrently. Additionally, steps in accordance with this disclosure may occur with other steps not presented and described herein. Furthermore, not all illustrated steps or operations may be used to implement a method in accordance with the disclosed subject matter.

At 1202, the process 1200 determines a head token for coding a transform coefficient of the transform block. As used in this disclosure, "determine" means to select, construct, identify, specify, generate, or other determine in any manner whatsoever. For example, the process 1200 can determine the token by traversing a coefficient token tree, such as the coefficient token tree 700 of FIG. 7. In an example, the process 1200 can determine that the head token is the TWO_PLUS_NEOB or the token TWO_PLUS_EOB.

At 1204, the process 1200 determines a tail token for coding the transform coefficient. For example, 1100 can determine that the tail token is one of the tokens of the set of tail tokens as described above. For example, the process 1200 can determine the token by using the same traversal of a coefficient token tree as that of 1202.

At 1206, the process 1200 determines a head context for coding the head token. The head context can be selected using one or more of a transform size, a plane type, a reference type, a band position, and a coefficient context as described above. Other information can be available for determining the head context. In an example, and as described above, the process 1200 can determine that the head context is one of the 576 contexts described above.

At 1208, the process 1200 determines a tail context for coding the tail token. The tail context can be selected using one or more of a transform size, a plane type, a reference type, a band position, and a coefficient context as described above. Other information can be available for determining the head context. The tail context is selected from a set of contexts that includes less contexts than the set of contexts from which the head context is selected.

At 1210, the process 1200 codes the transform coefficient using the head token and the tail token.

In an implementation, the transform block is coded using a scan direction and the scan positions of the scan direction are mapped to first band positions having a first cardinality and second band positions having a second cardinality smaller than the first cardinality. In an example, the first band positions can be {0, 1, 2, 3, 4, 5}, which is a set having a cardinality of 6. In an example, the second band positions can be {0, 1, 2}, which is a set having a cardinality of 3. The head context can be selected using the first band positions. The tail context can be selected using the second band positions.

In an implementation, the head context is selected using a head set of transform sizes, the head set having a first cardinality and the tail context is selected using a tail set of transform sizes, the tail set having a second cardinality that is smaller than the first cardinality. In an example, the head set of transform sizes can be {TX_4×4, TX_8×8, TX_16×16, TX_32×32}, which has a cardinality of 4. In an example, the tail set of transform sizes can be {TX_4×4, TX_8×8, TX_16×16_ABOVE}, which has a cardinality of 3.

As mentioned above, a codec can use backward-adaptivity or backward updates for entropy coding. As such, at the beginning of coding (i.e., encoding and decoding) a frame (also referred to as an image) of video or a portion of the frame (e.g., a tile), some or all of the probability distributions to be used in entropy coding of the current frame and/or tile can be initialized. The probability distributions include binary probability distributions.

For example, the probability distributions for coding of the intra-prediction mode can be initialized. For example, the probability distributions for coding the non-zero map (such as the non-zero map 706 of FIG. 7) can be initialized. For example, the probability distributions for coding the index of the scan positions groups can be initialized. For example, when not coded using by-pass mode, the probability distributions for coding significant bits of the offset within the scan positions group can be initialized. For example, the probability distributions for coding the end-of-block of a non-zero map, as described with respect to FIG. 9, can be initialized.

A binary probability distribution, for coding binary symbols (i.e., 0 and 1 symbols), can be described and stored by using an N-bit value. In a non-limiting example, and in a case where N=8, a probability value of 1 can indicate that the symbol 0 has a probability of 1/256, and 128 can indicate that symbol 0 and symbol 1 have the same probability of 128/256=0.5.

Implementations according to this disclosure can reduce the complexity (i.e., the number of bits) of storing and describing the initial probability values. In some situations, such as the case of backward adaptivity, a precise probability value is often not necessary because the probabilities are updated as the frame and/or tile are coded. That is, as a frame and/or tile is coded, an adaptation scheme adapts the initial probabilities based on the statistics of the frame and/or tile. As such, using fewer bits to store the initial probability values does not necessarily result in any worse or better coding performance.

Implementations according to this disclosure can map an N-bit (e.g., N=8) probability value to a smaller M-bit representation, where M<N is an integer number. The probability mapping can be such that the worst-case loss associated with mapping is a very small value. The probability mapping can be a non-uniform mapping that, given the initial probabilities of a probability distribution, maps the probability space [0, 1] (if the probability is represented as a real number) or [1, 255] (if the probability is represented as an integer number) into representative values that can be stored in fewer bits than the initial probability values.

Figure 13:
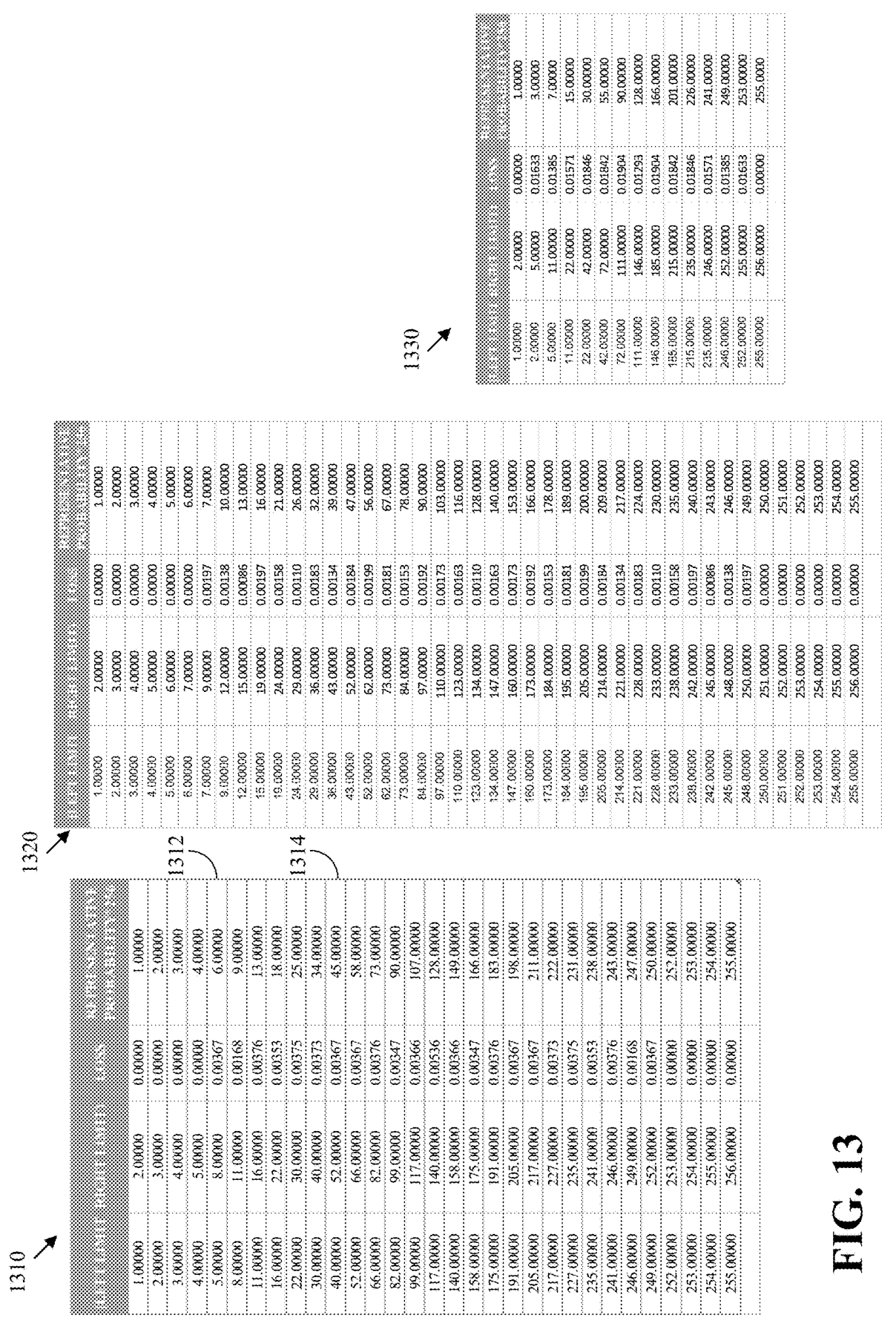

FIG. 13 is a diagram of examples 1300 of probability mappings according to implementations of this disclosure. The probability mapping 1310 maps [1, 255] to 31 distinct values, which can be stored using 5 bits. The row 1312, corresponding to an included LEFT LIMIT of 5 and an excluded RIGHT LIMIT of 8 (i.e., partition [5, 8)), indicates that probabilities in the set {5/256, 6/256, 7/256} are mapped to a single probability 6/256 (as shown in the column REPRESENTATIVE PROBABILITY*256). The row 1314 indicates that if an initial probability falls in the partition [40, 52), then the representative probability value of 45 is used instead.

When a probability p is mapped to another probability q, a loss in coding performance may result. The column labeled LOSS depicts the worst-case percentage loss due to using the mapping. For example, the worst-case loss associated with the rows 1312 and 1314 is 0.00367. The loss associated with the row 1312 can be described as follows: Using the representative probability 6, instead of any of the precise probabilities {5, 6, 7}, a maximum of 0.00367 additional bits may be used.

The loss is given by equation (3) as:

$$\text{Loss} = D(p\|q)/H(p) \qquad (3)$$

In equation (3), D(p‖q) is the Kullback-Leibler (KL) divergence, defined on the same alphabet (e.g., the binary symbols 0 and 1), between the distributions q and p, and H(p) denotes the entropy of the distribution (p, 1−p).

The KL divergence denotes the relative entropy between the two distributions (p, 1−p) and (q, 1−q). The KL divergence is given by equation (4):

$$D(p\|q) = p\log\frac{p}{q} + (1-p)\log\frac{(1-p)}{(1-q)} \qquad (4)$$

The entropy H(p) can as given by equation (5):

$$H(p) = -p\log p - (1-p)\log(1-p) \qquad (5)$$

Given an initial probability distribution, a probability mapping can be determined in any number of ways. In an example, the probability mapping can be determined using an exhaustive search algorithm that finds a partition composition (i.e., left and right limits for the partitions of the mapping) that meets a loss threshold for each partition or for the mapping as a whole. That is, given the initial probability distributions and a loss threshold as inputs, the search algorithm finds a suitable partition of [1, 255] such that the representative probabilities of the partitions minimize the cost for a given partition.

Minimizing the cost for a given partition means that the loss associated with the partition cannot be greater than the input loss threshold. For example, the input loss threshold used for generating the probability mapping 1310 is 0.6% and the search algorithm determined the partition [40, 52] (i.e., the row 1314) with a loss of 0.367%, which is smaller than the loss threshold.

The search algorithm can proceed by finding a first partition that meets the loss threshold before proceeding to finding another partition. The search algorithm can start the search at the top (e.g., starting with a partition that includes the LEFT LIMIT of 1), at the bottom (i.e., starting with a partition that ends with the RIGHT LIMIT of 256), or at some other partition.

Using the above mentioned search algorithm, and using a different loss threshold, a probability mapping 1320 can be obtained such that [1,255] is mapped to 43 distinct values. In this example, loss is consistently below 0.2%. The probability mapping 1320 can be stored using 6 bits. The higher the number of partitions in the probability mapping, the smaller the loss.

Probability mapping 1330 is yet another example of mapping [1, 255] using another loss threshold. The probability mapping includes 15 distinct values (i.e., 15 partitions). As such, 4 bits are required to store the values of the probability mapping 1330.

In some implementations, an encoder encodes initial probability distributions in an encoded bitstream, such as in the header of a frame, and a decoder decodes the initial probability distributions from the encoded bitstream. Using probability mapping as described above, the number of bits required to transmit the initial distributions can be reduced. In some cases, the reduction can be significant, such as when the frame is significantly compressed.

Probability mappings can be used to signal probability values in backward updates of probabilities or to describe initial probability values to use at the start of coding (encoding or decoding) a picture (i.e., frame) or a tile of a frame.

As mentioned above, a current block can be predicted using intra prediction. An intra prediction mode uses pixels peripheral to the current block being predicted. Pixels peripheral to the current block are pixels outside the current block. Many different intra prediction modes can be available. Some intra prediction modes use a single value for all pixels within the prediction block generated using at least one of the peripheral pixels. Other intra prediction modes, which may be referred to as directional intra prediction modes, each can have a corresponding prediction angle. Other types of intra prediction modes can also be available.

An intra prediction mode may be selected by the encoder as part of a rate distortion loop. In brief, various intra prediction modes may be tested to determine which type of prediction will have the lowest distortion for a given rate, or number of bits to be transmitted in an encoded video bitstream, including overhead bits included in the bitstream to indicate the type of prediction used.

In an example, the following 13 intra prediction modes can be available: DC_PRED, V_PRED, H_PRED, D45_PRED, D135_PRED, D117_PRED, D153_PRED, D207_PRED, D63_PRED, SMOOTH_PRED, SMOOTH_V_PRED, and SMOOTH_H_PRED, and PAETH_PRED. One of the 13 intra prediction modes can be used to predict a luminance block.

Figure 14:
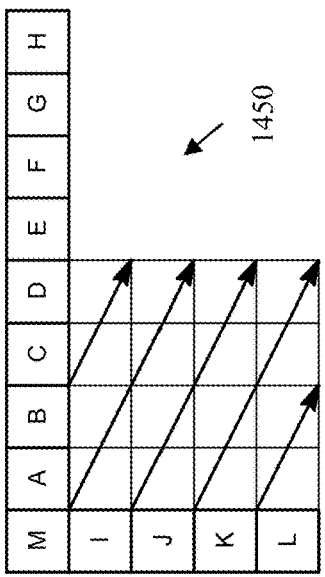
FIG. 14 is a diagram of examples of intra prediction modes according to implementations of this disclosure.
Figure 14:
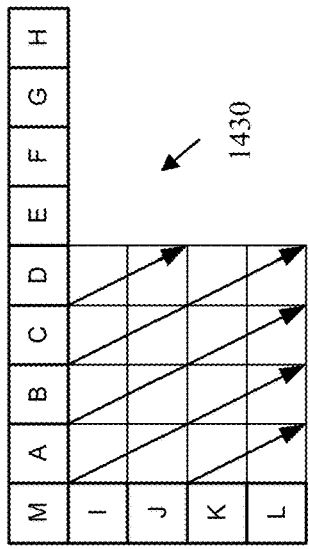
Figure 14:
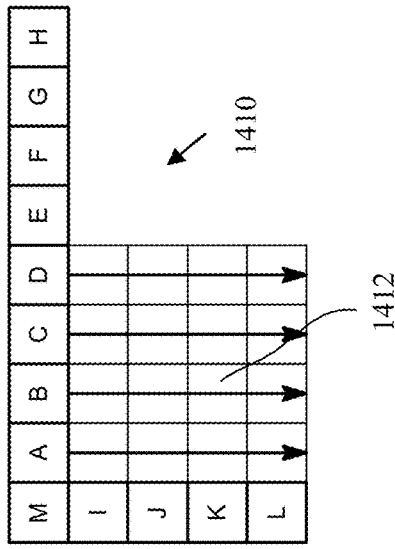
Figure 14:
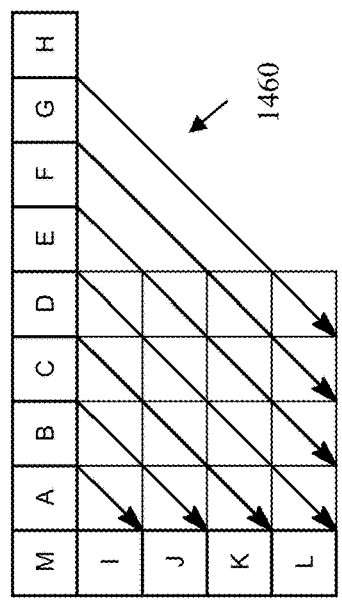
Figure 14:
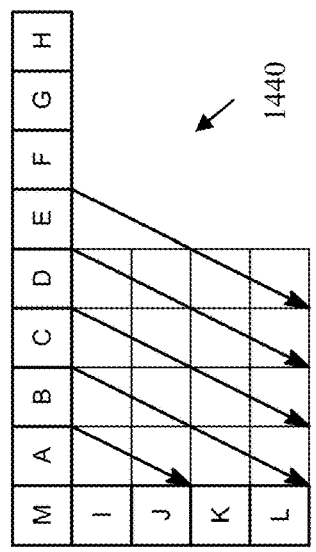
Figure 14:
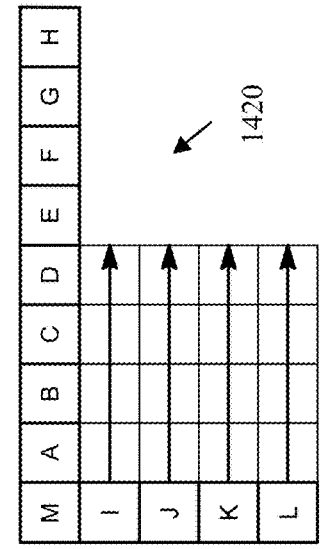

FIG. 14 is a diagram of examples of intra prediction modes according to implementations of this disclosure. Intra prediction mode 1410 illustrates the V_PRED intra prediction mode, which is referred to generally as a vertical intra prediction mode. In this mode, prediction block pixels in the first column are set to the value of peripheral pixel A; prediction block pixels in the second column are set to the value of pixel B; prediction block pixels in the third column are set to the value of pixel C; and prediction block pixels in the fourth column are set to the value of pixel D.

Intra prediction mode 1420 illustrates the H_PRED intra prediction mode, which is referred to generally as a horizontal intra prediction mode. In this mode, prediction block pixels in the first row are set to the value of peripheral pixel I; prediction block pixels in the second row are set to the value of pixel J; prediction block pixels in the third row are set to the value of pixel K; and prediction block pixels in the fourth row are set to the value of pixel L.

Intra prediction mode 1430 illustrates the D117_PRED intra prediction mode, so-called because the direction of the arrows, along which the peripheral pixels will be propagated to generate the prediction block form a diagonal, is at an angle of about 117° from the horizontal. That is, in the D117_PRED, the prediction angle is 117°. Intra prediction mode 1440 illustrates the D63_PRED intra prediction mode, which corresponds to a prediction angle of 63°. Intra prediction mode 1450 illustrates the D153_PRED intra prediction mode, which corresponds to a prediction angle of 153°. Intra prediction mode 1460 illustrates the D135_PRED intra prediction mode, which corresponds to a prediction angle of 135°.

The prediction modes D45_PRED and D207_PRED (not shown) correspond, respectively, to the prediction angles 45° and 207°. DC_PRED corresponds to a prediction mode where all prediction block pixels are set to a single value that is a combination of the peripheral pixels A-M.

In the PAETH_PRED intra prediction mode, the prediction value of a pixel is determined as follows: 1) calculate a base value as a combination of some peripheral pixels, and 2) use, as the prediction pixel, the one of the some peripheral pixels that is closest to the base value. The PAETH_PRED intra prediction mode is illustrated using, as an example, a pixel 1412 (at location x=1, y=2). In an example of a combination of some peripheral pixels, the base value can calculated as base=B+K−M. That is, the base value is equal to: the value of the left peripheral pixel that is in the same row as the pixel to be predicted+the value of the above peripheral pixel that is in the same column as the pixel−the value of the pixel in the top-left corner.

In the SMOOTH_V intra prediction mode, the prediction pixels of the bottom-most row of the prediction block are estimated with the value of the last pixel in the left column (i.e., the value of pixel at location L). The remaining pixels of the prediction block are calculated by quadratic interpolation in the vertical direction.

In the SMOOTH_H intra prediction mode, the prediction pixels of the right-most column of the prediction block are estimated with the value of the last pixel in the top row (i.e., the value of pixel at location D). The remaining pixels of the prediction block are calculated by quadratic interpolation in the horizontal direction.

In the SMOOTH_PRED intra prediction mode, the prediction pixels of the bottom-most row of the prediction block are estimated with the value of the last pixel in the left column (i.e., the value of pixel at location L) and the prediction pixels of the right-most column of the prediction block are estimated with the value of the last pixel in the top row (i.e., the value of pixel at location D). The remaining pixels of the prediction block are calculated as scaled weighted sums. For example, the value of a prediction pixel at location (i, j) of the prediction block can be calculated as the scaled weighted sum of the values of pixels $L_j$, R, $T_i$, and B. The pixel $L_j$ is a pixel in the left column and on the same row as the prediction pixel. The pixel R is the pixel as provided by SMOOTH_H. The pixel $T_i$ is a pixel in the above row and on the same column as the prediction pixel. The pixel B is the pixel as provided by SMOOTH_V. The weights can be equivalent to a quadratic interpolation in the horizontal and vertical directions.

The intra prediction mode selected by the encoder can be transmitted to a decoder in the bitstream. The intra prediction mode can be entropy coded (encoded by the encoder and/or decoded by a decoder) using a context model.

Some codecs use the intra prediction modes of the left and above neighbor blocks as the context for coding the intra prediction mode of a current block. Using FIG. 14 as an example, the left neighbor block can be the block containing the pixels I-L, and the above neighbor block can be the block containing the pixels A-D.

A codec can include a probability distribution for each combination of intra prediction modes used by the left neighbor block and above neighbor block. As such, using the above 13 prediction modes, 169 probability distributions (corresponding to 13*13=169 contexts) may are stored. To retrieve a probability distribution, the codec can perform a procedure that includes the steps:

cdf_prob kf_y_mode_cdf[13][13][13];
left=left neighbor intra mode (or DC_PRED if unavailable)
above=above neighbor intra mode (or DC_PRED if unavailable)
prob_table=kf_y_mode_cdf[left][above];

For ease of reference, the above procedure is referred as the ctx-combinations technique. In the ctx-combinations technique, left stores the intra prediction mode of the left neighbor block. If the intra prediction mode of the left neighbor block is not available, then the DC-PRED intra prediction more may be assumed. Above stores the intra prediction mode of the top neighbor block. If the intra prediction mode of the above neighbor block is not available, then the DC-PRED intra prediction mode may be assumed.

An intra prediction mode may not be available because, for example, the current block is at the edge (e.g., top-most and/or left-most block) of the frame or the neighbor block (left or above) was inter-predicted. The intra prediction mode may not be available for other reasons. The probability distribution (i.e., prob_table) can be retrieved from a three-dimensional array (i.e., kf_y_mode_cdf) that includes the probability distributions for all combinations of left and above intra prediction modes. In an example, the first dimension corresponds to the left neighbor intra prediction mode (e.g., 13 values), the second dimension corresponds to the above neighbor intra prediction mode (e.g., 13 values), and the third dimension corresponds to the values of a probability distribution.

As indicated above, each probability distribution includes 13 probability values (i.e., a probability value for each of the prediction modes). As such, there are 12 freedoms (i.e., only 12 of the 13 probability values are stored per context). In some implementations, a 13th entry that is a constant (e.g., a 0) may also be stored.

The number of stored probability distributions and/or probability values per probability distribution can be reduced by reducing the number of contexts for coding an intra prediction mode.

In an example, the number of contexts can be reduced when some of the intra prediction modes exhibit certain characteristics. For example, the probabilities of some of the intra prediction modes may not significantly change based on the left intra prediction mode and/or the above intra prediction mode. Such intra prediction modes may be equally probable regardless of the left and above intra prediction modes. In an example, the SMOOTH_PRED, SMOOTH_V_PRED, and SMOOTH_H_PRED prediction modes may exhibit such characteristics.

Implementations according to this disclosure can reduce the number of contexts available for coding the intra prediction mode of a current block using a procedure that includes the steps:

1. cdf_prob kf_y_mode_cdf[13][2][13];
2. left=left neighbor intra mode (or DC_PRED if unavailable)
3. above=above neighbor intra mode (or DC_PRED if unavailable)
4. if (left==above)
   a. prob_table=kf_y_mode_cdf[left] [0];
5. else if (left !=SMOOTH_PRED && left !=SMOOTH_H_PRED && left !=SMOOTH_V_PRED)
   a. prob_table=kf_y_mode_cdf[left] [1];
6. else
   a. prob_table=kf_y_mode_cdf[above] [1];

For ease of reference, the above procedure is referred to as the first-ctx-reduction technique. Using the first-ctx-reduction technique, the number of contexts can be reduced to 26. As such, the number of contexts used to code (encode/decode) the intra prediction modes of luminance blocks can be reduced by approximately 85%. In the steps 4-4a above, if the left neighbor block and the above neighbor block use the same intra prediction mode, then the left intra prediction mode is used to retrieve a probability distribution. This accounts for 13 probability distributions. The steps 5-6 can be summarized as: if one of left or above neighbors uses a smooth prediction mode (i.e., one of SMOOTH_PRED, SMOOTH_V_PRED, or SMOOTH_H_PRED), then retrieve a probability distribution using the other intra prediction mode. These steps account for another 13 probability distributions.

In an implementation, the steps can be used to determine the context for coding the intra-prediction modes of blocks of keys frame (also known as golden frame). In a key frame, all blocks are predicted using intra prediction.

Figure 15:
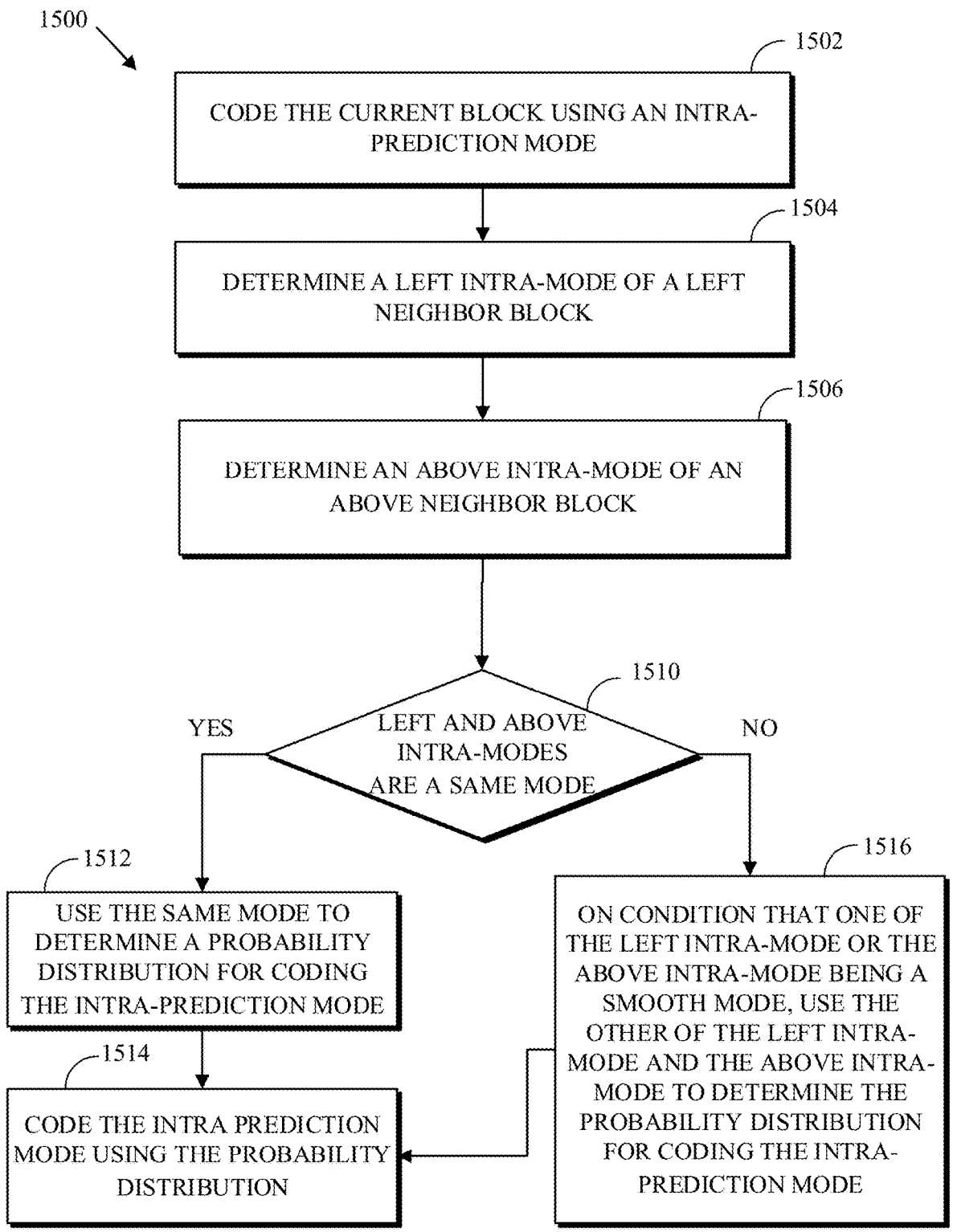
FIG. 15 is a flowchart diagram of a process for intra-coding a current block according to an implementation of this disclosure.

FIG. 15 is a flowchart diagram of a process 1500 for intra-coding a current block according to an implementation of this disclosure. The process 1500 can be implemented by an encoder such as the encoder 400 of FIG. 4. When implemented by an encoder, coding means encoding in an encoded bitstream, such as the compressed bitstream 420 of FIG. 4. For example, the process 1500 can be performed in whole or in part by the entropy encoding stage 408 of the encoder 400. The process 1500 can be performed by a decoder such as the decoder 500 of FIG. 5. When implemented by a decoder, coding means decoding from an encoded bitstream, such as the compressed bitstream 420 of FIG. 5. For example, the process 1500 can be performed in whole or in part by the entropy decoding stage 502 of the decoder 500 and the encoded video bitstream can be the compressed bitstream 420 of FIG. 5.

Implementations of the process 1500 can be performed by storing instructions in a memory such as the memory 204 of the receiving station 106 to be executed by a processor such as CPU 202, for example.

The process 1500 can be implemented using specialized hardware or firmware. Some computing devices can have multiple memories, multiple processors, or both. The steps or operations of the process 1500 can be distributed using different processors, memories, or both. For simplicity of explanation, the process 1500 is depicted and described as a series of steps or operations. However, the teachings in accordance with this disclosure can occur in various orders and/or concurrently. Additionally, steps in accordance with this disclosure may occur with other steps not presented and described herein. Furthermore, not all illustrated steps or operations may be used to implement a method in accordance with the disclosed subject matter.

At 1502, the process 1500 codes the current block using an intra-prediction mode. At 1504, the process 1500 determines a left intra-mode (i.e., an intra prediction mode) of a left neighbor block. In an implementation, if the left intra-mode is not available, then the left intra-mode is assumed to be the DC_PRED mode. At 1506, the process 1500 determines an above intra-mode (i.e., an intra prediction mode) of an above neighbor block. In an implementation, if the above intra-mode is not available, then the above intra-mode is assumed to be the DC_PRED mode.

At 1510, if the left intra-mode and the above intra-mode are the same, then the process 1500 proceeds to 1512; otherwise the process 1500 proceeds to 1516. At 1512, the process 1500 uses one of the left intra-mode or the above intra-mode (which are the same) to determine a probability distribution for coding the intra-prediction mode. As such, on condition that the left intra-mode and the above intra-mode being equal to a same mode, using the same mode to determine a probability distribution for coding the intra-prediction mode. As used in this disclosure, "determine" means to select, construct, identify, specify, generate, or other determine in any manner whatsoever. For example, the probability distribution can be retrieved from a memory.

At 1516, on condition that one of the left intra-mode or the above intra-mode being a smooth mode, the process 1500 use the other of the left intra-mode and the above intra-mode to determine the probability distribution for coding the intra-prediction mode. In an implementation, the smooth mode can be one of SMOOTH_PRED, SMOOTH_H_PRED, and SMOOTH_V_PRED. At 1514, the process 1500 codes the intra-prediction mode using the probability distribution.

The number of contexts for coding the intra prediction mode of a current can be reduced by splitting the available intra prediction modes into classes. Each class can include one or more intra prediction modes. The number of symbols coded for an intra prediction mode can depend on the class of the intra prediction mode.

In an example, the 13 intra prediction modes described above can be split into classes as shown in Table II.

TABLE II

| Intra Prediction Mode | Intra Prediction Class |
| --- | --- |
| DC_PRED | DC |
| H_PRED | H |
| V_PRED | V |
| SMOOTH_PRED, SMOOTH_V_PRED, and SMOOTH_H_PRED | SMOOTH |
| PAETH_PRED | PAETH |
| D45_PRED, D135_PRED, D117_PRED, D153_PRED, D207_PRED, D63_PRED | OTHER |

A first symbol can indicate the intra prediction class of the intra prediction mode. As there are six (6) intra prediction classes in Table II, using the ctx-combinations technique for determining a probability distribution for coding the first symbol, a total of 36 contexts are possible. The 36 contexts corresponding to six (6) possible classes for the left neighbor block and six (6) possible classes for the above neighbor class. Each of contexts includes five (5) probability values. Using the first-ctx-reduction technique, only 12 (=6*2) contexts are required to code the first symbol.

If the intra prediction mode is in the class SMOOTH, then using the ctx-combinations technique for determining a probability distribution for coding a second symbol, a total of nine (9) contexts are possible. The nine (9) contexts corresponding to three (3) possible smooth intra prediction modes for the left neighbor block and three (3) possible smooth intra prediction modes for the above neighbor class. Using the first-ctx-reduction technique, only one (1) context is required. Each context includes 2 probability values.

If the intra prediction mode is in the class OTHER, then using the ctx-combinations technique for determining a probability distribution for coding the second symbol, a total of 36 contexts are possible. The 36 contexts corresponding to six (6) possible intra prediction modes in the OTHER class for the left neighbor block and six (6) possible intra prediction modes in the OTHER class for the above neighbor class. Using the first-ctx-reduction technique, only 12 contexts are required. Each context provides five (5) probability values.

For simplicity of explanation, the processes 600, 900, 1200, 1500, and 1700 are each depicted and described as a series of blocks, steps, or operations. However, the blocks, steps, or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

The aspects of encoding and decoding described above illustrate some encoding and decoding techniques. However, it is to be understood that encoding and decoding, as those terms are used in the claims, could mean compression, decompression, transformation, or any other processing or change of data.

The words "example" or "implementation" are used herein to mean serving as an example, instance, or illustration. Any aspect or design described herein as "example" or "implementation" is not necessarily to be construed as preferred or advantageous over other aspects or designs. Rather, use of the words "example" or "implementation" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of transmitting station 102 and/or receiving station 106 (and the algorithms, methods, instructions, etc., stored thereon and/or executed thereby, including by encoder 400 and decoder 500) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of transmitting station 102 and receiving station 106 do not necessarily have to be implemented in the same manner.

Further, in one aspect, for example, transmitting station 102 or receiving station 106 can be implemented using a general-purpose computer or general-purpose processor with a computer program that, when executed, carries out any of the respective methods, algorithms and/or instructions described herein. In addition, or alternatively, for example, a special purpose computer/processor can be utilized which can contain other hardware for carrying out any of the methods, algorithms, or instructions described herein.

Transmitting station 102 and receiving station 106 can, for example, be implemented on computers in a video conferencing system. Alternatively, transmitting station 102 can be implemented on a server and receiving station 106 can be implemented on a device separate from the server, such as a hand-held communications device. In this instance, transmitting station 102 can encode content using an encoder 400 into an encoded video signal and transmit the encoded video signal to the communications device. In turn, the communications device can then decode the encoded video signal using a decoder 500. Alternatively, the communications device can decode content stored locally on the communications device, for example, content that was not transmitted by transmitting station 102. Other transmitting station 102 and receiving station 106 implementation schemes are available. For example, receiving station 106 can be a generally stationary personal computer rather than a portable communications device and/or a device including an encoder 400 may also include a decoder 500.

Further, all or a portion of implementations of the present disclosure can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations and aspects have been described in order to allow easy understanding of the present disclosure and do not limit the present disclosure. On the contrary, the disclosure is intended to cover various modifications and equivalent arrangements included within the scope of the appended claims, which scope is to be accorded the broadest interpretation so as to encompass all such modifications and equivalent structure as is permitted under the law.

What is claimed is:

1. A method for coding a frame of a video stream, comprising:
    selecting a first initial probability distribution for coding at least a first portion of the frame, wherein first values of the first initial probability distribution are stored using M bits, wherein M is a first positive integer;
    updating, to obtain an updated first initial probability distribution and using backward adaptivity, the first initial probability distribution responsive to coding the first portion of the frame, wherein second values of the updated first initial probability distribution are stored using N bits, wherein N is a second positive integer that is greater than M;
    mapping the updated first initial probability distribution to a second initial probability distribution, wherein third values of the second initial probability distribution are stored using M bits; and
    coding a second portion of the frame using the second initial probability distribution as an initial probability distribution.

2. The method of claim 1, wherein mapping the updated first initial probability distribution to the second initial probability distribution comprising:
    mapping a range [1, 255] of probability values to ($2^M-1$) values, wherein each probability value of the probability values corresponds to a respective left limit and a respective right limit such that any value in a left-closed interval consisting of [the respective left limit, the respective right limit) maps to the each probability value.

3. The method of claim 1, wherein mapping the updated first initial probability distribution to the second initial probability distribution comprising:

determining a partition composition that meets a loss threshold, wherein the partition composition consists of intervals, each interval consists of a respective left limit and a respective right limit.

4. The method of claim 1, wherein N is 8.

5. The method of claim 4, wherein M is one of 4, 5, or 6.

6. The method of claim 1, wherein the first initial probability distribution and the second initial probability distribution are used for coding intra-prediction modes.

7. The method of claim 1, wherein the first initial probability distribution and the second initial probability distribution are used for coding non-zero maps.

8. The method of claim 1, wherein the first initial probability distribution and the second initial probability distribution are used for coding end-of-block locations of non-zero maps.

9. An apparatus for decoding frames of a video stream, comprising:
a memory; and
a processor, the processor configured to:
decode, from a compressed bitstream, an initial probability distribution for decoding at least a first portion of a first frame, wherein first values of the initial probability distribution are stored using M bits, wherein M is a first positive integer;
update, to obtain an updated initial probability distribution, the initial probability distribution while decoding the first portion of the first frame, wherein second values of the updated initial probability distribution are stored using N bits, wherein N is a second positive integer that is greater than M;
and
decode a second frame of the video stream using the updated initial probability distribution.

10. The apparatus of claim 9, wherein the processor is further configured:
map a range [1, 255] of probability values to ($2^M-1$) values, wherein each probability value of the probability values corresponds to a respective left limit and a respective right limit such that any value in a left-closed interval consisting of [the respective left limit, the respective right limit) maps to the each probability value.

11. The apparatus of claim 9, wherein the processor is further configured to:
determine a partition composition that meets a loss threshold, wherein the partition composition consists of intervals, each interval consists of a respective left limit and a respective right limit.

12. The apparatus of claim 9, wherein N is 8.

13. The apparatus of claim 12, wherein M is one of 4, 5, or 6.

14. The apparatus of claim 9, wherein the initial probability distribution and the updated initial probability distribution are used for coding intra-prediction modes.

15. The apparatus of claim 9, wherein the initial probability distribution and the updated initial probability distribution are used for coding non-zero maps.

16. The apparatus of claim 9, wherein the initial probability distribution and the updated initial probability distribution are used for coding end-of-block locations of non-zero maps.

17. An apparatus for encoding a frame of a video stream, comprising:
a memory; and
a processor, the processor configured to:
select a first initial probability distribution for encoding at least a first portion of the frame, wherein first values of the first initial probability distribution are stored using M bits, wherein M is a first positive integer;
update, to obtain an updated first initial probability distribution, the first initial probability distribution while encoding the first portion of the frame, wherein second values of the updated first initial probability distribution are stored using N bits, wherein N is a second positive integer that is greater than M;
map the updated first initial probability distribution to a second initial probability distribution, wherein third values of the second initial probability distribution are stored using M bits; and
encode the second initial probability distribution in a compressed bitstream.

18. The apparatus of claim 17, wherein to map the updated first initial probability distribution to the second initial probability distribution comprises to:
map a range [1, 255] of probability values to ($2^M-1$) values, wherein each probability value of the probability values corresponds to a respective left limit and a respective right limit such that any value in a left-closed interval consisting of [the respective left limit, the respective right limit) maps to the each probability value.

19. The apparatus of claim 17, wherein to map the updated first initial probability distribution to the second initial probability distribution comprises to:
determine a partition composition that meets a loss threshold, wherein the partition composition consists of intervals, each interval consists of a respective left limit and a respective right limit.

20. The apparatus of claim 17, wherein N is 8 and M is one of 4, 5, or 6.

* * * * *